United States Patent [19]
Keim et al.

[11] Patent Number: 5,603,984
[45] Date of Patent: Feb. 18, 1997

[54] SPRAY ELEMENT ESPECIALLY FOR MOLD SPRAYERS

[75] Inventors: Karl-Heinz Keim, Neu-Ulm; Rudi Kober, Stüssen; Hans-Dieter Renkl, Berghülen, all of Germany

[73] Assignee: Acheson Industries, Inc., Port Huron, Mich.

[21] Appl. No.: 562,852

[22] Filed: Nov. 27, 1995

Related U.S. Application Data

[63] Continuation of Ser. No. 302,362, Sep. 7, 1994, abandoned.

[30] Foreign Application Priority Data

Sep. 9, 1993 [DE] Germany .......................... 43 30 587.3
Jun. 14, 1994 [DE] Germany .......................... 44 20 679.8

[51] Int. Cl.$^6$ ...................................................... B05D 7/22
[52] U.S. Cl. ........................... 427/133; 427/236; 427/421
[58] Field of Search .................................. 427/133, 421, 427/236

[56] References Cited

U.S. PATENT DOCUMENTS

| | | | |
|---|---|---|---|
| 2,747,608 | 5/1956 | Grove | 137/853 |
| 3,298,391 | 1/1967 | Savage | 251/5 |
| 3,325,138 | 6/1967 | Connolly | 251/5 |
| 3,445,085 | 5/1969 | Eckel et al. | 251/5 |
| 3,687,365 | 8/1972 | Laesigg | 251/5 |
| 5,314,116 | 5/1994 | Krauth et al. | 239/533.13 |

FOREIGN PATENT DOCUMENTS

| | | | |
|---|---|---|---|
| 1675427 | 1/1973 | Germany | 251/5 |
| 146963 | 9/1982 | Japan | 251/5 |
| 9204126 | 3/1992 | WIPO | 239/1 |
| 92/20942 | 11/1992 | WIPO | 251/61.1 |

*Primary Examiner*—Janyce Bell
*Attorney, Agent, or Firm*—Dinnin & Dunn, P.C.

[57] ABSTRACT

Process for the application of a liquid die wall treatment agent to areas of the die walls of a molding device by means of at least one spray element with metering of the flow rate of the die wall treatment agent by a metering valve. The metering valve having a metering cross section for the liquid die wall treatment agent and influenced by a secondary fluid including a metering valve with a valve membrane of variable shape, one side of which is acted on by the die wall treatment agent, while the other side is acted on by the secondary fluid, and the pressure on at least one side of the membrane is influenced by flow rate adjusting means, which results in variable flow rates and the variable flow rates are determined by different positions of the membrane.

12 Claims, 15 Drawing Sheets

SPRAY ELEMENT ESPECIALLY FOR MOLD SPRAYERS

This is a continuation of U.S. patent application Ser. No. 08/302,362, filed Sep. 7, 1994, now abandoned.

The invention pertains to a spray element, especially for mold sprayers, comprising a feed line for fluid working medium and possibly a feed line for control air; an atomizing device connected to the feed line for working medium; and a switching valve, which can be controlled as a function of pressure, with an elastically pretensioned valve body for the optional making or breaking of the connection between the feed line for working medium and the atomizer.

Spray elements of this type are used in, for example, the spray tools of the mold spray devices required between the cycles of die-casting, drop forging, and other manufacturing operations involving the hot and cold working of metals to prepare the parts of the die for the next sequence of operations. For this purpose, the die is opened, and the spray tool is moved in between the parts, which are then cleaned of metal residues, lubricant residues, and other contaminants by the use of compressed air. They are then sprayed with a lubricant and can also be cooled with water.

Spray elements of the basic type in question are known, for example, from U.S. Pat. Nos. 4,714,199 and 4,365,754. In these spray elements, the valve body of the switching valve consists of a piston. The piston is pretensioned by a helical spring to keep the switching valve in the closed position, and in this position the piston thus prevents fluid working medium from passing through the switching valve and reaching the atomizer. According to what has been said above, the spray elements known from U.S. Pat. Nos. 4,714,199 and 4,365,754 have a complicated and, therefore, expensive design.

Another spray element of the general type in question is known from U.S. Pat. No. 3,807,641. In this spray element, the valve body of the switching valve is formed by a flexible membrane, which is pretensioned by a piston, which is itself pretensioned by a helical compression spring to keep the switching valve in the closed position. As result, the spray element known from U.S. Pat. No. 3,807,641 also has a complicated and, therefore, expensive design.

Against this background, the task of the present invention is to provide a spray element of the general type in question which is simpler in design and which therefore can be produced at lower cost.

This task is accomplished in accordance with the invention in that the valve body is designed to have an internal elastic pretension. By virtue of this measure specified in accordance with the invention, the valve body exercises not only its normal function, namely, of sitting on the valve seat and thus preventing the passage of working medium and, when the valve is opened, of rising above the seat and allowing the passage of working medium, but also the additional function of pretensioning the valve body (that is, of pretensioning itself) in the closing or opening direction of the switching valve. Because several functions are thus combined in a single component according to the invention, the number of components required to realize the spray element is reduced. Therefore, the spray element is simple in design and can thus be fabricated at low cost.

A valve body with the desired properties can be easily produced by making it out of an essentially elastic material, preferably a rubbery type of elastic, plastic or rubber. The desired degree of inner pretension can be effectively achieved through the suitable selection of material for the valve body and through the use of a suitable configuration.

So that the entire switching valve can be replaced as a single unit during maintenance, it is proposed that a valve seat element be provided to constitute the switching valve together with the valve body.

An especially simple way of obtaining the valve seat element is to manufacture it by the process of injection molding. Because the valve body is made of an elastic material, especially of a rubbery type of elastic material, the production tolerances which occur in conjunction with production by injection molding, i.e., tolerances which are possibly greater than those which occur in production by turning or boring, for example, can thus be easily compensated.

The switching valve can be easily inserted into the spray element if a recess to hold the switching valve is provided in a first housing part of the spray element. The feed lines for fluid working medium and possibly for control air can also be designed to pass through the first housing part.

The production of the spray element can be further simplified by assigning the atomizing device to a second housing part, which can be attached and removed from, the first housing part. When, in the assembled state of the spray element, the second housing part holds the switching valve in the recess which has been provided in the first housing part, easy access to the switching valve is guaranteed for any maintenance or repair operations which may prove necessary.

To simplify the production of the spray element, it is also proposed that at least one of the housing parts be produced by injection molding.

In principle, it is conceivable that the working medium can be atomized either by electrostatic means, by pressure spraying, by allowing it to strike an impact surface at high speed, or by some other method. So that the working medium can be atomized by compressed air, a feed line for working air which can be connected to the atomizing device is also provided in the spray element according to the invention. The atomizing process can occur here either by the internal mixing principle or by the external mixing principle. Both mixing principles are known in themselves. The spray element can be designed very simply by providing a first section of the feed line for working air in the first housing part and a second section of the feed line for working air in the second housing part.

So that all the conventional spray properties can be realized by means of the spray element according to the invention, it is proposed that the atomizing device be designed so that it can be connected to a conventional nozzle assembly.

In a preferred embodiment of the invention, it is provided that the valve seat element is designed as cylindrically symmetric and that it has to ring-shaped recesses, separated by a ring-shaped valve seat projection, on its outside periphery. Each of these ring-shaped recesses is bounded in the axial direction of the valve seat element by a ring-shaped supporting projection, and each recess is also connected by way of an associated transverse bore to an associated blind hole formed in the opposing end surface of the valve seat element, it being possible to connect one of the blind holes to the feed line for working medium and the other blind hole to the atomizing device. It is also provided in this embodiment that the valve body is designed as cylindrically symmetric with a central opening oriented in the axial direction, which has essentially the same diameter as the ring-shaped support projections of the valve seat element, the inside peripheral surface of the valve body resting, both in the opened and in the closed state of the switching valve, against the ring-shaped support projections of the valve seat element to form a seal against them. And finally, a chamber which makes it possible for the valve body to rise up off the valve seat element and which possibly can be connected to the feed line for control air is also provided. In this preferred embodiment, the switching valve is distinguished by an especially simple design. The valve body also assumes the function here of sealing off the switching valve against leakage of fluid working medium.

It is also conceivable in principle that the chamber which makes it possible for the valve body to rise can be formed by undercutting a section of the first housing part. To ensure the design of the spray element remains simple; however, it is proposed that this chamber be formed by a ring-shaped recess in the outside peripheral surface of the valve body.

There are various ways in which the switching valve can operate. For example, the switching valve can be a normally closed valve, which is opened by the action of compressed air. In a further elaboration of the preferred embodiment described above, the design can be kept simple by giving the ring-shaped support projections essentially the same outside diameter as the ring-shaped valve seat projection, and arrangements can also be made to allow the chamber which makes it possible for the valve body to rise to be connected to the feed line for control air. In the open state of the switching valve, the negative control air pressure will cause the internal peripheral surface of the valve body to move a certain distance away from the ring-shaped valve seat projection and therefore allow the passage of working medium. In the closed state of the switching valve, the internal pretension of the valve body causes its internal peripheral surface to rest against the ring-shaped valve seat projection to form a seal against it and thus prevent the passage of working medium.

Alternatively, however, it is possible for the valve seat element to have two additional ring-shaped recesses following after the two ring-shaped support projections in the axial direction, each of these two additional recesses being bounded in the area of the associated axial end of the valve seat element by an additional ring-shaped projection. Both these additional ring-shaped projections and the ring-shaped support projections have essentially the same outside diameter as the ring-shaped valve seat projection. In the area of the additional ring-shaped recesses of the valve seat element, control chambers which can be connected to the feed line for compressed air are provided, between which the chamber making it possible for the valve body to rise is located. In the open state of the switching valve, the positive control air pressure prevailing in the control chambers causes the inside peripheral surface of the valve body in the area of the chamber which makes it possible for the valve body to rise to be lifted up off the ring-shaped valve seat projection and therefore allows the passage of working medium. In the closed state of the switching valve, the inner pretension of the valve body causes it to rest with its inner peripheral surface against the ring-shaped valve seat projection to form a seal against and thus to prevent the passage of working medium. This embodiment offers the advantage that the valve can be operated with positive control air pressure, which is easy to obtain and manage.

So that it can be ensured in this alternative embodiment that the valve body will rise reliably from the valve seat element, it is proposed that the valve body be provided with essentially rigid inlay elements and that these elements be preferably embedded in the valve body. The embedded elements extend from the control-chamber sections of the valve body associated with the valve chamber in question to an intermediate section of the valve body, which is associated with the chamber which makes it possible for the valve body to rise; a deflection of the inlay elements resulting from a compression of the control chamber section under the action of positive control air pressure is transferred to the intermediate section, where it leads to the expansion of the valve body, which therefore rises up off the valve seat.

To realize an alternative method, the switching valve can be a normally open one, which is closed by the control air pressure. In a further elaboration of the preferred embodiment discussed above, the ring-shaped support projections can have a larger outer diameter then the ring-shaped valve seat projection, and arrangements can be made so that the chamber which makes it possible for the valve body to rise can be connected to the control air feed line. In the open state of the switching valve, the internal pretension of the valve body causes it to remain a certain distance away from the ring-shaped valve seat projection and, therefore, makes it possible for the working medium to pass through. In the closed state of the switching valve, a positive control air pressure causes the internal peripheral surface of the valve body to rest against the ring-shaped valve seat projection of the valve seat element to form a seal against it, thus preventing the passage of working medium. This embodiment also offers the advantage of simplicity of design.

In a realization of yet another alternative method, the switching valve can be a normally closed valve, which is opened by the pressure of the working medium. In this embodiment, the control air feed line can be eliminated, which leads to an additional simplification of the design. In an elaboration of the preferred embodiment described above, the ring-shaped support projections can, in this case, have essentially the same outside diameter as the ring-shaped valve seat projection. Thus, in the open state of the switching valve, a positive working medium pressure causes the internal peripheral surface of the valve body to remain a certain distance away from the ring-shaped valve seat projection and, therefore, makes it possible for the working medium to pass through. In the closed state of the switching valve, the internal pretension of the valve body causes its internal peripheral surface to rest against the ring-shaped valve seat projection to form a seal against it and thus prevents the passage of working medium.

So that the proper function of the switching valve can be ensured at all times, it is proposed that the chamber making it possible for the valve body to rise be connected by way of a compensating line to the environment.

To increase the operational reliability of the spray element according to the invention, it is also proposed that a pressure-monitoring device be installed in the control air feed line. It is possible, for example, for the supply of working medium to be cut off whenever this pressure monitor detects an abnormal value of the control air pressure. This is advantageous especially in the case of a normally open switching valve which is closed by control air pressure.

The invention also pertains to a valve seat element, to a valve body, and to a switching valve for a spray element according to the invention.

In addition, the invention pertains to a spray element, especially for die sprayers, comprising a feed line for fluid working medium, a feed line for working air, and an atomizer connected to the feed lines for working medium and working air, a pivoting nozzle element being assigned to the atomizer.

Spray elements of this type are known and are used, for example, in the die sprayers of the applicant so that sprayers can be set up as effectively as possible at the place where they are needed to meet the specific requirements of the work in question through the adjustment of the spray direction of the individual spray elements. It has been found in practice, however, that the known spray elements generate a relatively Large amount of noise, with result that the operators must work with hearing protection.

Against this background, it is a further goal of the invention to provide a spray element of the type described above which is distinguished by a considerable reduction in the amount of noise generated without sacrifice of the pivoting capacity of the nozzle element.

This goal is accomplished in accordance with the invention in that the atomizer operates according to the external mixing principle and in that a section of the working medium feed line leading to the pivoting nozzle element is designed as a section of flexible tubing. The air pressure required atomize the working medium by the external mixing principle to produce a given set of atomization properties is smaller than that required for atomization by the internal mixing principle, according to which the conventional spray elements operate with a pivoting nozzle. According to the internal mixing principle, a mixing chamber must be provided, from which the compressed air emerges at high velocity to atomize the working medium sufficiently and to preserve the achieved atomization properties until after the mist has emerged from the nozzle element. According to the external mixing principle, the working medium is atomized only after it has emerged from the nozzle. At this point, the working air can be made highly turbulent even without the help of a high working air pressure, which means that the working medium can still be atomized effectively. In addition, a relatively low working air pressure is sufficient to supply the working air to the outlet, because the nozzle element can be designed with large open cross sections for the compressed air. The latter design feature is possible, because there is no dynamic pressure to be overcome in the atomizer. The effects described above, which are mutually supportive, lead to a considerable reduction in the amount of noise generated without having any effect on the desirable properties of the atomized material. Through the use of a section of flexible tubing, the capacity of the nozzle element to pivot is retained at the same time.

The section of tubing can be fabricated inexpensively by making it of rigid plastic.

So that not only the spray direction but also the spray pattern of the spray element can be adjusted to the requirements of the specific application, it is proposed that the relative position of the orifice of the feed line for working medium and an outlet of the nozzle element be adjustable in the longitudinal direction of the working medium feed line.

This can be achieved in accordance with an alternative elaboration of the invention by, for example, providing the nozzle element with a central bore, through which the flexible section of tubing extends up to a point near the outlet. In this case, the position of the orifice of the tube can be adjusted simply by pushing the tube back and forth in the central bore relative to the outlet. The tube can be held in the central bore by the frictional forces resulting from a narrow-tolerance fit. It is also possible, however, for the tube to be held in position in the central bore by suitable fastening means such as a stud screw.

According to another alternative elaboration of the invention, it is provided that the nozzle element has a central bore provided with an internal, ring-shaped rib; that the flexible section of tubing can be inserted into the central bore essentially up as far as the ring-shaped rib; and that a tubular endpiece, which can be shifted in the longitudinal direction of the central bore, can be inserted from the outlet side into the central bore. The tubular endpiece can be designed so that it can screwed into the central bore adjust its position in the longitudinal direction in the central bore. The endpiece can also be held in place in the central bore by a suitable fastener such as a stud screw.

A further noise reduction can be achieved by providing a deflector wall for the arriving working air near the outlet. Such a wall increases the turbulence of the working air, which increases in turn the atomization of the working medium; or, if there is no need to increase the degree of atomization, the use of the deflector makes it possible to work with a lower working air pressure, which leads to a corresponding decrease in noise generation.

The invention also pertains to a nozzle element for use in a spray element according to the invention.

The invention is described in greater detail below on the basis of the attached drawing and a group of exemplary embodiments.

BRIEF DESCRIPTION OF THE DRAWINGS

FIG. 1 is a schematic diagram of a die sprayer, in the spray tool of which the spray element according to the invention can be installed;

FIG. 2 shows a schematic diagram of a spray tool equipped with spray elements according to the invention;

FIG. 3 shows a first embodiment of a spray element according to the invention;

FIG. 4 shows a second embodiment of a spray element according to the invention;

FIG. 5 shows a third embodiment of a spray element according to the invention;

FIG. 6 shows a fourth embodiment of a spray element according to the invention with a closed switching valve;

FIG. 7 shows a view of the fourth embodiment similar to that of FIG. 6, but with an open switching valve;

FIG. 8 shows a cross section through a valve body for the fourth embodiment on an enlarged scale;

FIG. 9 shows a schematic, perspective diagram of an inlay element assembly for a valve body according to FIG. 8;

FIG. 10 shows a first embodiment of a spray nozzle element;

FIG. 11 shows a second embodiment of a spray nozzle element; and

FIG. 12 shows a third embodiment of a spray nozzle element.

FIG. 1 shows a schematic diagram of a die sprayer, referred to as 10 in the following, which can be used, for example, to prepare die components **12*a* and 12*b* of a die 12** for the next stage of work in the production of structural components by means of a die-casting method such as aluminum die-casting.

In a die-casting method such as this, a filling chamber **15*a* of a filling device 15 is loaded through fill opening 15*b* with the liquid metal to be processed. Then the metal is forced by a pressure piston 15*c* into die 12. After the component thus fabricated has solidified completely, it is removed from the die. Die parts 12*a*, 12*b* of die 12 are mounted for this purpose on a stationary clamping plate 13*a* and a movable clamping plate 13*b*, respectively. Movable clamping plate 13*b* can be shifted back and forth in the directions of double arrow F to open and close die 12. Although only two clamping plates 13*a*, 13*b* with two die parts 12*a*, 12*b*** are shown in FIG. 1, it is also possible, of course, to use dies with more than two parts and a corresponding number of clamping plates.

Die sprayer 10 comprises a first travel unit 14, which is mounted permanently on an upper edge 13c of stationary clamping plate 13a. A second travel unit 16 is connected to first travel unit 14. This second unit can be moved horizontally back and forth, relative to first travel unit it, in the direction of double arrow A by means of an arm 16a, guided in first travel unit 14, under the action of a drive (not shown). In a similar manner, a spray tool 18, which carries a plurality of spray elements 20, can be moved vertically up and down relative to second travel unit 16 in the direction of double arrow B by means of an arm 18a guided in second travel unit 16 under the action of a drive (also not shown).

First travel unit 14 is connected to supply lines 22 for fluid working medium, to a supply line 24 for working air or blasting air, and to a supply line 26 for control air. These supply lines 22, 24, 26 are guided from first travel unit it all the way to spray tool 18. For the sake of clarity in the drawing, however, only the sections of these lines leading to first travel unit 14 are shown in FIG. 1.

Supply lines 22 for the working medium comprise a supply line 22a for water and a supply line 22b for lubricant. It is also possible, however, to provide additional supply lines 22 for working media such as for a second type of lubricant or the like, as indicated in FIG. 1 by dash-dot line 22c. A valve device 28 is provided in spray tool 18 or immediately in front of it so that the various supply lines 22a, 22b, etc., for working medium can be connected for service.

So that die 12 can be prepared for the next sequence of operations, die 12 is first opened and the finished part is removed. Then spray tool 18 is moved between the two halves 12a, 12b of the die by means of arms 16a, 18a. Then die parts 12a, 12b are cleaned of metal residues, lubricant residues, and other contaminants; cooled by sprays of water; sprayed with lubricant to prepare them for the next step of the work cycle; and possibly dried with blasts of air.

FIG. 2 shows a detailed drawing of the design of spray tool 18. In the present example, six spray elements 20 are installed on spray tool 18. The number and orientation of the spray elements can be varied in any way desired as a function of the specific application.

In spray tool 18, a main working medium line 30 is provided, from which secondary lines 32 branch off; in the drawing according to FIG. 2, these secondary lines extend in the plane of the drawing. From these secondary lines 32, junction working medium lines 34 branch off in turn, which, in the drawing according to FIG. 2, extend through the spray tool at a right angle to the plane of the drawing. In addition, junction lines 36 for blasting air or working air and 38 for control air are also provided in spray tool 18, again extending at a right angle to the plane of the drawing. These junction lines 36, 38 are connected to corresponding (not shown) main and secondary lines for working air and control air, respectively, which are designed in the same way as lines 30 and 32. The open ends of junction lines 34, 36, and 38 are sealed by cover planes 18b (see FIG. 1).

Spray elements 20 can be coordinated into a plurality of control circuits. For example, in FIG. 2, spray elements $20_1$ and $20_4$ are combined into a control circuit S1; spray elements $20_2$ and $20_5$ are combined into a control circuit S2; and spray elements $20_3$ and $20_6$ are combined into a control circuit S3.

This coordination can be realized in a simple way by connecting each of junction lines 38 for control air, i.e., the junction line assigned to spray elements $20_1$ and $20_4$ of control circuit S1, the junction line assigned to spray elements $20_2$ and $20_5$ of control circuit S2, and the junction line assigned to spray elements $20_3$ and $20_6$ of control circuit S3, to a separate main line for control air. The main control air lines of the individual control circuits can be supplied with control air independently of each other by means of, for example, a valve device (not shown).

From junction lines 34 for working medium, feed bores 40 lead to corresponding working medium feed lines 42 of spray elements 20; from junction lines 36 for working air, feed bores 44 lead to corresponding working air feed lines 46 of spray elements 20; and from junction lines 38 for control air, feed bores 48 leads to corresponding control air feed lines 50 of spray elements 20.

Inlet 30a of main line 30 for working medium shown in FIG. 2 is connected to an outlet line 28d of valve device 28. Supply lines 22a, 22b, and 22c are connected to inlet lines 28a, 28b, and 28c. respectively, of valve device 28. A flow rate control valve 22a1, 22b1, and 22c1 and a check valve 22a2, 22b2, and 22c2 are installed in each of inlet lines 28a, 28b, and 28c, respectively.

The pass-through openings of control valves 22a1, 22b1, and 22c1 can be adjusted independently of each other by means of a control unit 52 acting through control lines 54a, 54b, and 564c. For example, by opening valve 22a1 and closing valves 22b1 and 22c1, only water can be supplied as the working medium: by opening valve 22b1 and closing valves 22a1 and 22c1, only lubricant can be supplied; or by opening of valves 22a1 and 22b1 appropriately and closing valve 22c1, a lubricant mixture in a desired ratio can be supplied as working medium. Control unit 52 can be used to achieve wide variations in the discharge rates, viscosities, etc. of the working media to be mixed by varying, for example, the degrees to which valves 22a1, 22b1, 22c1 are opened.

FIG. 3 shows a first embodiment of a spray element 20 according to the invention. Spray element 20 comprises a first housing part 56 and a second housing part 58, which are preferably manufactured as injection-molded parts, with surfaces 56a and 58a resting against each other. The two parts are screwed together by means of threaded bolts (not shown). Feed line 42 for fluid working medium, feed line 46 for working air, and feed line 50 for control air are provided in first housing part 56.

Feed line 42 for working medium starts from a surface 56b facing away from surface 56a and extends toward surface 56a, ending at a recess 60 of circular cross section, which is open toward surface 56a. Recess 60 holds a switching valve 62, the structure of which will be described in detail further below. Feed line 46 for working air connects the two surfaces 56a, 56b to each other, and feed line 50 for control air, which also proceeds from surface 56b, ends at transverse bore 50a, which connects an outside peripheral surface 56c of the spray element with inside peripheral surface 60a of recess 60. The outer end of transverse bore 50a is sealed tightly by a plug 64.

In the ready-to-operate state of spray element 20, a switching valve 62 is present in recess 60 of the first housing part 56, as already described above. This valve comprises a valve seat element 66 and a valve body 68. The symmetry of both valve seat element 66 and valve body 68 is essentially cylindrical.

Valve seat element 66 has on its outside peripheral surface two ring-shaped recesses 66a, 66b, which are separated in the axial direction by a ring-shaped projection 66c, forming a valve seat, and bounded by two additional ring-shaped projections 66d, 66e. Ring-shaped projections 66c, 66d, and 66e all have essentially the same outside diameter. From the axial ends of valve seat element 66, blind holes 66f, 66g proceed, the blind ends of which are connected by transverse bores 66h, 66i to ring-shaped recesses 66a, 66b. To center valve seat element 66 in recess 60, a tubular shoulder 66k of the element engages in feed line 42 for working medium. The axial length of valve seat element 66 is calculated in such a way that, in the operating state of spray element 20, its end surface is essentially flush with surface 58a. Valve seat element 66 is preferably made as an injection-molded part.

Valve body 68 is tubular in design and surrounds valve seat element 66. For this purpose, an inside diameter of its passage 68a is essentially the same as or slightly smaller than the outside diameter of ring-shaped projections 66c, 66d, and 66e of valve seat element 66. On the outside periphery of valve body 68, there is a ring-shaped recess 68b, which cooperates with inside peripheral surface 60a of recess 60 to define a chamber 70, which makes it possible for valve body 68 is rise up from valve seat 66c. The outside diameter of valve body 68 is essentially the same as the inside diameter of recess 60.

Alternatively, chamber 70 could also be formed by an undercut 56d shown in broken line in FIG. 3. In this case, there would be no need for the ring-shaped recess 68b on the outer periphery of valve body 68.

In the operating state, valve seat element [sic; valve body—Ft. Ed.] 68 of spray element 20 projects beyond surface 56a and engages in a ring-shaped groove 72, formed in second housing part 58, this groove being used to center switching valve 62. Feed line 46 for blasting air continues in second housing part 58 as a line 74, which ends in a mixing chamber 76 by way of a transverse bore 74a, tightly sealed by a plug 74b at its outer end. Chamber 76 opens out onto a surface 58b of the second housing part facing away from surface 58a. This orifice 16a accepts a nozzle assembly 80.

Nozzle assembly 80 comprises a tubular main part 80a, at one end of which an externally threaded section 80a1 is provided. Main part 80a is screwed into orifice 76a of second housing part 58 by means of this externally threaded section 80a1. At its other end, main part 80a is designed with an externally threaded section 80a2. In the area of this externally threaded section 80a2, an inside space 80b of main part 80a is provided with an essentially spherical inside surface 80c. A ball joint 80d1 of a nozzle element 80d rests against this inside surface 80c; the ball is held in position by a cap nut 80e screwed onto externally threaded section 80a2.

A section of tubing 78 connected to blind hole 66g in the valve seat element passes through chamber 16 and projects into inside space 80b of main part 80a. In this inside space 80b, working medium-emerging from tube 78 is atomized according to the so-called internal mixing principle by compressed air arriving from mixing chamber 76 and thus is blown out through nozzle element 80d.

In the following, the function of spray element 20 according to FIG. 3 is explained. Switching valve 62 of spray element 20 is normally a closed valve, which is opened by a negative control air pressure. In FIG. 3, the normal state of switching valve 62 is shown, that is, its closed state. In this state, the inside peripheral surface of valve body 68 rests against valve seat 66c to form a seal and therefore prevents the working medium coming through line 42, blind hole 66f, transverse bore 66h, and ring-shaped recess 66a, from passing bet-ween valve seat 66c and valve body 68 and then continuing through ring-shaped recess 66b, transverse bore 66i, blind hole 66g, and section of tubing 18 into inside space 80b of nozzle assembly 80.

But when a negative control air pressure is applied via control air line 50 to chamber 70, valve body 68 is lifted up off of valve seat 66c by this negative pressure and allows the passage of working medium between valve seat 66c and valve body 68. Fluid working medium now arrives from feed line 42 in interior space 80b of nozzle assembly 80, where it is atomized by the blasting air conducted via feed lines 46, 74, 74a and chamber 76 into interior space 80h. The medium is then carried to nozzle element 80d, from which it emerges as a mist.

Valve body 68 is made of an elastic material such as rubber and is produced with an internal pretension, which pretensions it in the closed position; that is, in the position in which it prevents the passage of working medium between valve seat 66c and valve body 68.

The design of switching valve 62 as a normally closed valve offers the advantage than, for example, in the event that the control system fails because of a power outage, any further escape of working medium is reliably prevented. It is also possible, however, to design the switching valve as a normally open valve, which is closed by the control air pressure.

FIG. 4 shows a spray element equipped with a normally open switching valve of this type, which is closed by control air pressure. In FIG. 4, similar parts are provided with the same reference symbols as those used in FIG. 3, except that they are increased by 100. Spray element 120 is described in the following only insofar as it differs from spray element 20 according to FIG. 3. Otherwise, reference is made here explicitly to the description of spray element 20.

According to FIG. 3, spray element 120 differs from spray element 20 only in that ring-shaped valve seat projection 166c of valve seat element 166 of switching valve 162 has an outside diameter which is smaller than that of ring-shaped projections 166d, 166e. Because the diameter of the tubular opening of valve body 168 has the same diameter as that of ring-shaped projections 166d, 166e or a diameter only slightly smaller, a gap Sp is present between the inside peripheral surface of valve body 168 and the outside peripheral surface of valve seat 166c in the normal state of switching valve 162; that is, in the state unactuated by control air pressure. Because of this gap Sp, it is possible for fluid working medium to pass from line 142 through blind hole 166f and transverse bore 166h to ring-shaped recess 166a and then to flow between valve seat 166c and valve body 168 into ring-shaped recess 166b, and from there through transverse bore 166i, blind hole 166g, and section of tubing 178 into interior space 180b of nozzle assembly 180. Here the working medium is atomized by the blasting air conducted via feed lines 146, 174 and chamber 176 into interior space 180b of nozzle assembly 180. The medium is then conducted to nozzle element 180d, from which it emerges as a mist.

To block the passage of working medium between valve seat 166c and valve body 168, a positive pressure is applied to chamber 170 (the chamber which makes it possible for the valve body to rise) via control air feed line 150; this positive pressure presses valve body 168 against valve seat 166c. Through adjustment of the control air pressure, it is also possible effectively to meter the amount of working medium being supplied. Valve body 168, which is made of an elastic material, preferably of a rubbery type of elastic material, is pretensioned in such a way that it returns automatically to its normal or open position shown in FIG. 4 as soon as the positive control air pressure has been turned off.

In control air feed line 150, a pressure sensor 184 is installed, which measures the value of the pressure prevailing in the feed line and sends this information to control unit 52 (see FIG. 2). Whenever pressure monitor 184 in feed line 150 detects an unintended pressure drop, control unit 52 closes control valves 22a1, 22b2, 22c2 (see FIG. 2), so that no more working medium can be supplied through control line 142.

FIG. 5 shows a third embodiment of a spray element according to the invention equipped with a normally closed switching valve, which is opened by the pressure of the working medium. In FIG. 5, similar parts are provided with the same reference symbols as those in FIG. 3, except that they are increased by 200. Spray element 220 is described in the following only to the extent that it differs from spray element 20 according to FIG. 3. Otherwise, reference is made explicitly here to the description of spray element 20.

According to FIG. 3, spray element 220 differs from spray element 20 primarily in that no line corresponding to control air feed line 50 is provided. Ring-shaped projection 266c forming the valve seat has essentially the same diameter as that of ring-shaped projections 266d, 266e. Therefore, in the normal or closed state of switching valve 262 shown in FIG. 5, valve body 268, by virtue of its internal pretension, rests with its inside peripheral surface firmly on valve seat 266c.

When working medium is now introduced into ring-shaped recess 266a via feed line 242, blind hole 266f, and transverse bore 266h, it cannot pass by valve seat 266c into ring-shaped recess 266b, because the hydraulic force exerted by the pressure of the working medium on valve body 268 is at first smaller than the force of the internal pretension of valve body 268. When the pressure of the working medium rises above a limit pressure $p_G$, however, the internal pretension of valve body 268 is overcome by the hydraulic force and the valve body is lifted up off of valve seat 266c. Working medium is thus able now to pass into ring-shaped recess 266b and then to proceed through transverse bore 266i, blind hole 266g, and section of tubing 278 into the interior space 280b of nozzle assembly 280. Here the working medium is atomized by the blasting air conducted via feed lines 246, 274, and mixing chamber 276 into interior space 280b of the nozzle assembly 280; and the atomized medium is then carried onwards to nozzle element 280d, from which in emerges as a spray mist.

To be able to ensure that valve body 268 is always lifted up off of valve seat 266c at the same limit pressure $P_G$, a compensating bore 282 is provided, which connects ring-shaped space 268b on the outer periphery of valve body 268 to the outside environment. Valve body 268 does not return to its closed position shown in FIG. 5 until a second limit pressure $P_G'$ is reached, which is smaller than limit pressure $P_G$, because the surface area of valve body 268 acted on by the hydraulic pressure in the open state is greater than the surface area of the valve body acted on by the hydraulic pressure in the closed state.

FIG. 6 shows a fourth embodiment of a spray element according to the invention, where similar parts are provided with the same references symbols as those used in FIG. 3, except that they are increased by 300. Spray element 320 is described in the following only to the extent that it differs from spray element 20 according to FIG. 3. Otherwise, reference is made explicitly here to the description of spray element 20.

Spray element 320 is equipped, like spray element 20 according to FIG. 3, with a normally closed switching valve 362, which is opened by control air. Switching valve 362, however, is designed in such a way that it can be opened by means of a positive control air pressure.

Valve seat element 366 has on its outside peripheral surface not only ring-shaped recesses 366a, 366b, which are bounded by ring-shaped projections 366d, 366e and connected to blind holes 366f, 366g, but also two additional ring-shaped recesses 366m, 366n, which are bounded by ring-shaped projections 366d, 366e and by two additional ring-shaped projections 366o, 366p. Ring-shaped projections 366c, 366d, 366e, 366o, 366p all have essentially the same outside diameter.

Valve body 368 has a tubular design. Its inside diameter is essentially the same as, or slightly smaller than, the outside diameter of ring-shaped projections 366c, 366d, 366e, 366o, 366p of valve seat element 366.

On the outside periphery of valve body 368, a ring-shaped recess 368b is provided, which, with the cooperation of the inside peripheral surface of recess 360, defines a chamber 370a, which makes it possible for valve body 368 to be lifted up off of valve seat 366c. In the assembled state of switching valve 362, chamber 370a extends essentially over the area of ring-shaped recesses 366a, 366b of valve seat element 366. Valve body 368 also has two ring-shaped recesses 368c, 368d, which, with the cooperation of the inside peripheral surface of recess 360, define two chambers 370b, 370c. Chambers 370a, 370b, and 370c are separated from each other by ring-shaped projections 368e, 368f of valve body 368. In the assembled state of switching valve 362, chambers 370b, 370c extend essentially over the area of ring-shaped recesses 366m, 366n of valve seat element 366.

Chambers 370b, 370c are connected by transverse bores 350b, 350a to control air feed line 350. Chambers 370b, 370c can also be formed, alternatively, by undercuts in first housing part 356.

In the following, the function of switching valve 362 is explained in greater detail with reference to FIGS. 6 and 7.

Switching valve 362 of spray element 320 is a normally closed valve, which is opened by control air pressure. According to FIG. 3, in contrast to switching valve 62, switching valve 362 can be opened by a positive control air pressure.

FIG. 6 shows the normal state of switching valve 362, that is, its closed state. In this state, the inside peripheral surface of valve body 368 rests to form a seal against valve seat 366c and, therefore, prevents the flow of working medium from line 342 to nozzle assembly 380.

But when a positive control air pressure is applied to chambers 370b, 370c through control air line 350, valve body 368, as shown in FIG. 7, is pressed by this positive pressure into ring-shaped recesses 366m, 366n. This deformation of valve body 368 also extends into the area of valve body 368 situated near chamber 370a; ring-shaped projections 368e, 368f of the valve body act as pivot lines, with the result that valve body 368 is lifted up off of valve seat 366c in the area of chamber 370a, and working medium is now able to flow between valve seat 366c and valve body 368.

FIG. 8 shows another embodiment of a valve body, by means of which the function described above can be realized in an especially effective manner.

Elongated inlay elements 386 are embedded in valve body 368'; these inlay elements are made, for example, of steel or some other suitably rigid material. One longitudinal end 386a of each inlay element 386 is located in a section of valve body 386' which is assigned to one of the outer ring-shaped grooves 368c', 368d', while the other longitudinal end 386 is located in a section of valve body 386' which is assigned to central ring-shaped groove 368b'.

As shown with particular clarity in FIG. 9, inlay elements 386 have, in a middle section 386c, bumps 386c1, 386c2, 386c3, which are pushed up in alternating directions with respect to the normal to the surface of each inlay element 386. Alternating bumps 386c1, 386c2, 386c3 form an access channel 386d, though which a wire hoop 388 is pulled. In the example shown, six inlay elements 386 are lined up in a row on wire hoop 388, but any suitable number of inlay elements desired can be provided. Wire hoops 388 are located near ring-shaped projections 368e', 386f (see FIG. 8).

When the section of valve body 368' assigned to ring-shaped grooves 368c', 368d' is compressed as a result of a control air pressure applied to chambers 370b, 370c (see FIG. 7), ends 386a of inlay elements 386 pivot inward around wire hoop 388, which serves as the axis of rotation. Because of the rigidity of inlay elements 386, opposite ends 386b of inlay elements 386 swing outward and, therefore, lead to an expansion of the section of valve body 368' assigned to ring-shaped groove 386b'. Thus, a simple and reliable way of ensuring that inlay elements 386 are able to lift valve body 368' up off of valve seat 366c is obtained (see FIG. 7). As an alternative, it is also possible to lay inlay elements 386 on the inside peripheral surface of valve body 368' rasher than to embed them, so that, in the assembled state of switching valve 362, they will be located between valve seat element 366 and valve body 368'.

Spray element 320 according to FIG. 6 also differs from spray element 20 according to FIG. 3 also with respect to the feed lines to the nozzle assembly and the design of the nozzle element.

Feed line 346 for blasting air continues in second housing part 358 in the form of a line 374/374a, which ends at a chamber 376. In an orifice 376a of this chamber 376, a nozzle assembly 380 is installed, the design of which is essentially the same as that of nozzle assembly 80 according to FIG. 3. In contrast to that assembly, however, nozzle assembly 380 has a nozzle element 380d which operates by the external mixing principle, according to which working medium is atomized outside the nozzle element by turbulent compressed air. A section of tubing 378 connected to blind hole 366g of valve seat element 366 serving to supply working medium, therefore, extends all the way to nozzle element 380d, passes through it, and finally ends at an outlet opening 380f.

In the following, the design of nozzle element 380d is explained in detail on the basis of FIG. 10.

In a ball joint 380d1 of nozzle element 380d, a recess 390 is made on the side of nozzle element 380d opposite outlet 380f. On its outlet end, nozzle element 380d has a turbulence chamber 392, into which tube 378 opens. Recess 390 and turbulence chamber 392 are connected to each other by way of longitudinal bores 394. Tube 378 is inserted through a central longitudinal bore 398 of nozzle element 380d and is held in position there by friction. In addition or alternatively thereto, it is possible to provide a stud screw (not shown) in nozzle element 380d to fasten the tube in place. To make it possible for nozzle element 380d to pivot, tube 378 is made of a flexible material such as rigid plastic, As can be seen in FIGS. 6 and 7, recess 390 is connected to compressed air chamber 376. Compressed air arriving from the chamber passes through bores 394 on its way into turbulence chamber 392. With reference to FIG. 10 again, the compressed air is conducted through bores 394 onto an outlet-side boundary wall 392a of turbulence chamber 392, which serves as a deflector wall to create turbulence in the stream of air. Working medium emerging from tube 378 is atomized by the turbulent compressed air outside outlet 380f to form a spray mist 396.

By means of the embodiment described above in accordance with FIG. 10, it is easy to prepare a pivoting nozzle element which operates according to the external mixing principle. The external mixing principle offers the advantage over the internal mixing principle that, because the working medium is atomized outside opening 380f, it is nearly if not completely impossible for outlet 380f to become clogged.

Nozzle element 380d, furthermore, is distinguished by the small amount of noise which it produces. The reason for this is that, in order to atomize a given mount of working medium by the external mixing principle, a smaller air pressure value is sufficient to reach specified atomization properties than in atomization by the internal mixing principle. According to the internal mixing principle, a mixing chamber must be provided, from which the compressed air emerges at high velocity to atomize the working medium to a sufficient extent and to preserve these atomization properties until after the mist has emerged from the nozzle element. In contrast, the working medium under the external mixing principle is not atomized until after it has emerged from the nozzle orifice, for which purpose a lower velocity is sufficient because of the more intense turbulence of the compressed air at this outlet. Furthermore, because there it no need to overcome any dynamic pressure, the nozzle elements can be designed with larger open cross sections for the passage of the compressed air. Therefore, for a given air throughput, a much lower air pressure value is required to achieve the same quality of atomization, which has a favorable effect on the generation of noise. The use of a deflector wall intensifies the turbulence of the compressed air also, so that, for a given set of atomization properties, the work can be accomplished at an even lower flow velocity and, therefore, at an even lower air pressure, which leads to a further reduction in the amount of noise generated.

The reason for this is that, in a nozzle element operating according to the external mixing principle, there is no need to provide a mixing chamber, and it is therefore possible to accomplish the work with larger open cross sections and correspondingly lower velocities while achieving the same air throughput.

In the case of nozzle element 380d' shown in FIG. 11, tube 378' projects slightly beyond outlet 380f'. Otherwise, nozzle element 380d' is designed in exactly the same way as nozzle element 380d.

Because of the different way in which the orifice 378a, 378a' of tube 378, 378' is positioned relative to outlet 380f, 380f' of nozzle element 380d, 380d', the pattern of the spray produced by spray element 380d' is changed. Starting from the arrangement shown in FIG. 10, with which a spread angle α of the spray mist is obtained, spray angle α' of the spray mist decreases progressively the farther tube 378' projects from central bore 389' of nozzle element 380d'.

In addition to the advantages already discussed on the basis of FIG. 10, the additional advantage is therefore obtained that the spray pattern of the spray element can be adjusted freely.

Yet another embodiment of the nozzle element is shown in FIG. 12. In this embodiment, central bore 398" is divided by a ring-shaped flange 380d2"; tube 378" rests against the side of this flange which faces recess 390". On the outlet side, central opening 398" is designed with an internal thread 398a", into which another tube 399" provided with an external thread is screwed. So that tube 399" can be turned, it can be designed, for example, with an internal hexagonal section 399a". Additional tube 399" can be secured against rotating by a stud screw (not shown), for example, in nozzle element 380d".

Under consideration of the preceding discussion of FIGS. 10 and 11, it is easy to see that, by turning additional tube 399" relative to nozzle element 380d", the spread angle α" of the spray mist can be easily changed as desired.

Although, in the embodiments described above, ring-shaped spaces 66a, 66b, 166a, 166b, 266a, 266b, 366a, and 366b connected to transverse bores 66h, 66i, 166h, 166i, 266h, 266i, 366h, and 366i as well as ring-shaped spaces 366m, 366n are provided and described as being on the outside peripheral surface of the valve seat element, it is also possible in principle to provide these ring-shaped spaces on the inside peripheral surface of the valve body.

Under another aspect, the invention pertains to a process for the application of a liquid die wall treatment agent to areas of the die walls of a molding device by means of at least one spray element, the flow rate of the die wall treatment agent being metered by means of a metering valve, which influences an effective metering cross section for the liquid die wall treatment agent and which can itself be influenced by a secondary fluid.

A process such as this is known from West German Patent No. 3,644,184 A1. In these spray elements, control air acts in the opening direction on the valve body of the metering valve, which is designed as a needle valve, and thus moves the valve body against the action of a helical compression spring, which pretensions the valve body in the closing direction, until the valve body comes to rest against a stop. The die wall treatment agent acts on the valve needle in the radial direction and thus exerts no force on it in either the opening or the closing direction. The effective metering cross section of the metering valve, which can be moved only between a completely closed and a completely open position, is adjusted and kept constant during the spray process by means of a metering screw, which serves to adjust the position of the stop.

But it is also important to remember that individual areas of dies require different amounts of die wall treatment agent to ensure that the molded article acquires the optimum surface properties. For example, when a casting die is sprayed with lubricant or parting agent, a larger amount of lubricant is required in the area of depressions than in the area of flat wall sections of the die, because, in the former case, the surfaces extending around the depression mean that the surface area to be sprayed is larger.

It is easy to see that, if the die is not sprayed with a sufficient amount of lubricant, it is possible, for example, for the casting to become welded at certain points to the die. But spraying the inside of the die with too much lubricant also impairs the quality of the finished casting. It is sufficient here merely to point out that a lubricant consists of lubricating substances contained in a carrier liquid in a manner similar to that known from lacquers, in which the actual dye is present in a solvent. When the lubricant now strikes the wall of the die, the carrier liquid evaporates, and the lubricating substances precipitate onto the wall of the die. If too much lubricant is sprayed onto a certain area of the die wall, the lubricant will run, and therefore the lubricating substances will also run off downward under the effect of gravity and thus fail to cover the die wall sufficiently with lubricant.

In the known die spray systems, the effective metering cross section of the metering valve is set to a compromise value, which takes into account both the areas of the die wall with a low requirement for die wall treatment agent and the areas of the die wall with a high requirement for die wall treatment agent. The possibility of adjusting the effective cross section to a very low value and to cover the areas requiring larger amounts of die wall treatment agent by spraying them more than once can be considered only in the case of products with very high quality specifications because of the extra time required for such a process in practice and the resulting loss of productivity.

Against this background, it is the task of the invention to provide a process for the application of a liquid die wall treatment agent to areas of the die walls of a molding device, that is, a process which makes it possible, in a single spray pass, to dispense quickly the amount of die wall treatment agent that will satisfy the individual requirements.

This task is accomplished in accordance with the invention in that:

(a) a metering valve with a valve membrane of variable shape, the membrane being kept essentially free of guidance friction, is used;

(b) one side of the valve membrane is acted on by the die wall treatment agent, while the other side is acted on by the secondary fluid;

(c) the pressure on at least one side of the membrane is influenced by flow rate-adjusting means, which, under certain reproducible settings, result in flow rates which are reproducibly correlated to these settings; and (d) the different flow rates are determined by the different suspension states of the membrane.

The preferred secondary fluid is air, because it is easy to manage and is available at low cost. In the following, the process according to the invention is therefore always discussed under the assumption that air is being used as the secondary fluid.

In the process according to the invention, the effective metering cross section of the metering valve is adjusted through the play of forces of two pressures, which act on the valve membrane in opposite directions, i.e., the opening direction and the closing direction. As a result, defined force relationships can be established at the membrane, and these relationships keep the membrane in defined states of suspension. As a result, it is possible to achieve reproducible and infinitely variable settings for any desired flow rate between a completely open and a completely closed state of the metering valve. As a result of the use of a membrane which is essentially free of guidance friction, the process according to the invention is characterized in that the metering valve responds very quickly to a desired change in the flow rate.

As the secondary fluid, a control-fluid is used which is not mixed with the die treatment liquid.

It is possible to keep the pressure of the die wall treatment agent constant and to vary the pressure of the secondary fluid by acting on the flow rate-adjusting means. This has the advantage that the amount of die wall treatment agent allowed to pass through the metering valve can be varied over a wider range.

It is also possible, however, to keep the pressure of the secondary fluid constant and to vary the pressure of the die wall treatment agent by acting on the flow rate-adjusting means. When air is used as the secondary fluid, it is possible in this case to omit a separate air feed line and to use atmospheric pressure as the secondary fluid pressure.

If the pressure of the die wall treatment agent is adjusted in accordance with the results of monitoring the contact behavior of the die wall treatment agent with the individual areas of the die wall and if the pressure of the secondary fluid is then made to follow the pressure of the die wall treatment agent in correspondence with the individual desired flow rate by adjustment of the flow rate-adjusting means, it is possible not only to control the amount of die wall treatment agent being dispensed but also to vary the properties of the spray jet by varying the pressure of the die wall treatment agent.

As a result, it is possible, for example, to counteract the Leidenfrost effect, which consists in the formation of a vapor blanket on the hot walls of the die when droplets of die wall treatment agent strike the die. Such a blanket prevents the die walls from being wetted by the droplets and thus keeps the die walls from being covered sufficiently with die wall treatment agent. If the pressure of the die wall treatment agent is increased, the kinetic energy of the droplets increases, too, which reduces the tendency for a vapor blanket to form and thus leads to an improvement in the wetting of the die walls. Until now, the only way to counteract the Leidenfrost effect was to increase the degree to which the areas of the die wall in question were cooled. The increase in stress resulting from the use of a "harder" spray jet is an effect far more preferable than the stress on the material caused by the quenching associated with more intensive cooling, which considerably reduces the service life of the die. Beyond this, increasing the pressure of the die wall treatment agent also makes it possible to achieve a further increase in the productivity of the process, inasmuch as the cooling step can be reduced or even completely eliminated.

If the surfaces of the membrane on which the pressures act are essentially constant, the desired flow rates can be set by using the flow rate-adjusting means to adjust the specific pressure difference between the pressure of the die wall treatment agent and the pressure of the secondary fluid.

Because a gaseous atomizing agent is supplied to the die wall treatment liquid downstream from the effective metering cross section in such a way that the pressure downstream from the effective metering cross section is not significantly affected by this atomizing agent, it is possible in a simple manner to ensure that the knowledge of the feed pressure of the die wall treatment agent and of the pressure of the secondary fluid will be sufficient for achieving the reproducible adjustment of the effective metering cross section. This variant of the process is relevant especially when die wall treatment agents and atomizing agents such as blast air are mixed according to the external mixing principle. In a spray element working according to the external mixing principle, defined pressure relationships must always prevail downstream from the metering valve, because any reverse effects of the blast air pressure on the pressure of the die wall treatment agent would interfere with the proper mixing of the blast air and the die wall treatment agent outside the spray element.

It is also possible, however, to supply a gaseous atomizing agent at a variable feed rate to the die wall treatment liquid downstream from the effective metering cross section in such a way that the pressure downstream from the effective metering cross section is affected and to reset the pressure of the die wall treatment agent and/or the pressure of the secondary fluid as a function of the pressure thus affected. This variant of the process is relevant especially in spray elements which operate according to the internal mixing principle, in which the mixing of die wall treatment agent and blast air occurs in a mixing chamber. It is advantageous, therefore, for the pressure affected in this way to be monitored in this mixing chamber of the spray element.

Through the use of a metering valve with a tubular membrane, which is acted on from one side, preferably the inside, by the die wall treatment liquid and on the other side by the secondary fluid and which, together with a ring-shaped contact surface, defines the effective metering cross section, it is possible to make large actuation surfaces available to the die wall treatment agent and to the secondary fluid. As a result, the influence of forces such as an additional closing force originating from the elasticity of the membrane or from its internal pretension, the magnitudes of such forces remaining essentially constant, can be decreased in comparison with the compressive force to which they are added. This makes it possible to achieve more precise control of the resulting compressive forces and thus an extremely sensitive adjustment of the effective metering cross section.

The precise adjustability of the effective metering cross section can be improved even more by the use of a metering valve with pressure actuation surfaces, i.e., the surfaces exposed to the pressure of the die wall treatment liquid and to the pressure of the secondary fluid, which are essentially independent of the shape of the membrane as it varies during operation.

Under yet another aspect, the invention pertains to a process for the application of a liquid die wall treatment agent to areas of the walls of a die of a molding device by means of at least one spray element, the flow rate of the die wall treatment agent being metered by a metering valve, which influences an effective metering cross section for the liquid die wall treatment agent, where, during a spray process, the spray element is moved relative to the molding device along a predetermined path, and where the effective metering cross section is specified in advance as a function of the each position of the spray element on the path and is positively adjusted for the position in question as the path is traversed.

This process is characterized in that the amount of die wall treatment agent required to produce a casting with optimum properties can be supplied precisely to each die wall area of the molding device, regardless of the topography of the die walls, because, through the movement of the spray element relative to the molding device, it is possible to approach and to spray even undercut areas of the die wall with precision.

In addition, the invention pertains to a process for the application of a liquid die wall treatment agent to die wall areas of a molding device by means of at least one spray element, in which, during the spray process, the spray element is moved along a predetermined path relative to the molding device, where the amount of liquid die wall treatment agent dispensed per unit time by the spray element is specified in advance as a function of each position of the spray element on the path and is positively adjusted for the position in question as the path is traversed.

This process can also take into precise account any topography of the die which may occur. Furthermore, simple open-and-close valves, i.e., valves which have a constant flow rate in the open state, can be used in this process. The flow rate is varied in this case by changing the cycle ratio, i.e., the ratio between the period of time during which the die wall treatment agent is ejected and the total time. For this purpose, it is also possible to use valves which are not controlled by a secondary fluid; electromagnetically actuated valves, for example, are suitable for this purpose. It is obvious that the duration of the individual valve opening intervals must be short enough—the exact value being a function of the speed at which the spray tool moves along the path—to produce a quasi-continuous spray jet.

When the speed along the path is variable, the quantity of liquid die wall treatment agent dispensed is preferably determined under consideration of the speed and/or under consideration of operating parameters such as the local die temperatures, which can be accessed by appropriate sensor devices. It is easy to see that the quantity of liquid die wall treatment agent dispensed at a certain position along the path per unit time is proportional as a first approximation to the path speed selected in the particular case. The faster the tool travels along the path, the larger the amount of die wall treatment agent which must be dispensed per unit time. In a more precise equation, it will also be necessary to include a certain lead time, which takes into account the time it takes for the droplets to travel to the wall and the components of motion imparted to them by the motion of the spray element along the path.

The process according to the invention is explained in greater detail below on the basis of several process variants and with reference to the attached drawing.

Figure 1:
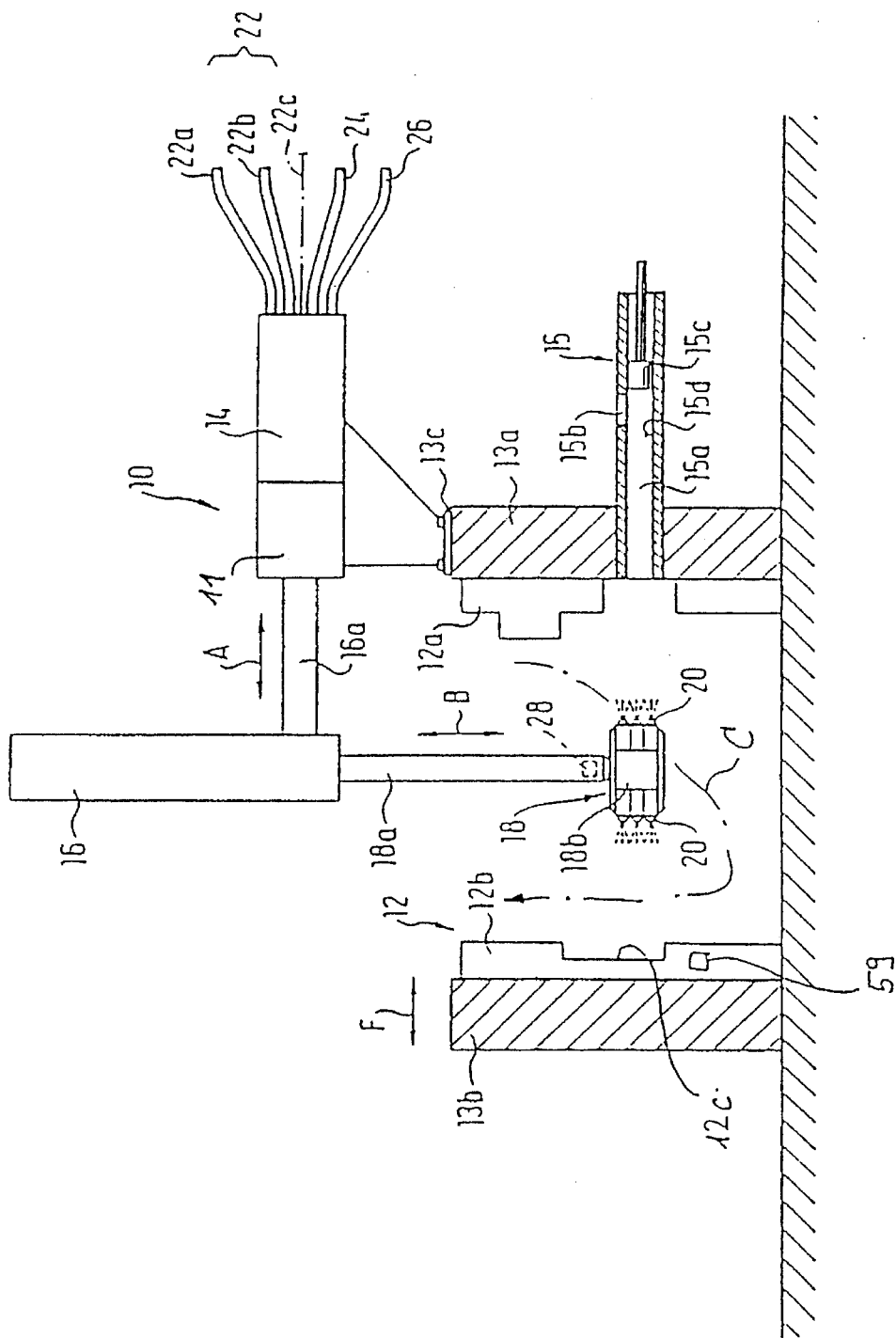

The process according to the invention is described in the following with reference to a spray element 20, which forms part of a die sprayer 10, as was described in detail above with reference to FIG. 1. Die sprayer 10 comprises, according to FIG. 1, an X-travel unit 14, a Y-travel unit 16, and a Z-travel unit 11, this last unit serving to shift spray tool 18 in the direction essentially perpendicular to the plane of the drawing.

Die sprayer 10 serves, as also described above, to prepare the parts 12a, 12b of die 12 for the next work cycle, the die being used in the production of components by means of a die-casting process, e.g., the aluminum die-casting process. For this purpose, after die 12 has been opened and the finished component has been removed, spray tool 18 is moved by means of XYZ travel units 14, 16, 11 into die 12, where it is carried along a path C (shown by the dash-dot line in FIG. 1), during which die 12 is cleaned of metal residues, lubricant residues, and the like by means of, for example, blast air; cooled by spraying with water; spray-coated with lubricant; and possibly dried with blast air.

As is easy to see, the individual parts of the die require different treatments during preparation for the next casting cycle in order to achieve a molded article with optimum surface properties. In particular, the individual areas require different amounts of lubricant. For example, when a die-casting mold is spray-coated with lubricant, a larger amount of lubricant is required in, for example, the area of depressions 12c, like those present in die part 12b on the left in FIG. 1, than is required in the area of flat sections of the die wall.

If die 12 is not covered by a sufficient quantity of lubricant, it is possible for the casting to become welded locally to die 12. But the spray-coating of die 12 with an insufficient amount of lubricant is not the only way in which the die walls can end up with an insufficient coating of lubricant; on the contrary, spraying the die with too much lubricant can also lead to this effect. Lubricants usually consist of lubricating substances dispersed in a carrier liquid, as is also the case with lacquers, for example, in which the dye is present in a solvent. When a droplet of lubricant strikes die 12, the carrier liquid evaporates, and the dispersed lubricating substances remain on the wall of the die. If the die is sprayed with too much lubricant, the lubricant runs off in the downward direction under the effect of gravity, leaving the die walls without a sufficient coating of lubricant.

According to what has been said above, it is therefore desirable for the individual areas of the die walls to receive individual treatment to the greatest possible extent in order that a molded article which meets even the highest quality specifications can be produced. For this purpose, a die sprayer 10 according to the invention is used, with a spray tool 18 which has a plurality of spray elements 20.

Spray elements 20, as discussed above in reference to FIG. 2, can be divided into a plurality of control circuits. According to FIG. 2, all control circuits S1, S2, and S3 are fed from a single main lubricant line 30, and the individual control is accomplished by way of separate control air feed lines 38, which connect spray element planes 18d (indicated only in broken line in FIG. 2), arranged in sequence in the direction perpendicular to the plane of the drawing according to FIG. 2. It is also possible, of course, to provide separate feed lines for control air, for blast air, and for lubricant for each control circuit. In addition, each spray element 20 can form its own separate control circuit and be supplied separately with control air, blast air, and lubricant.

Figure 10:
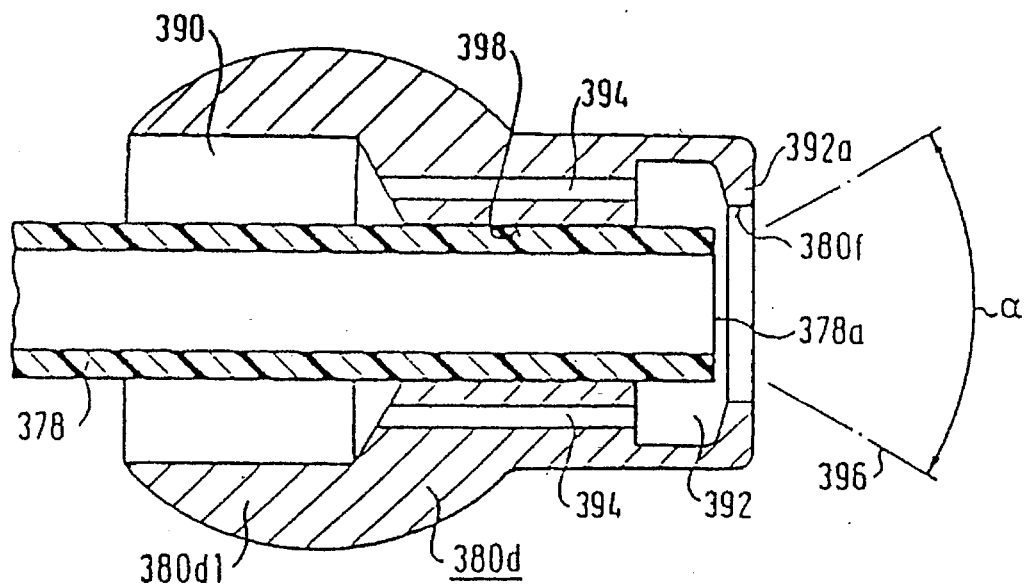
Figure 11:
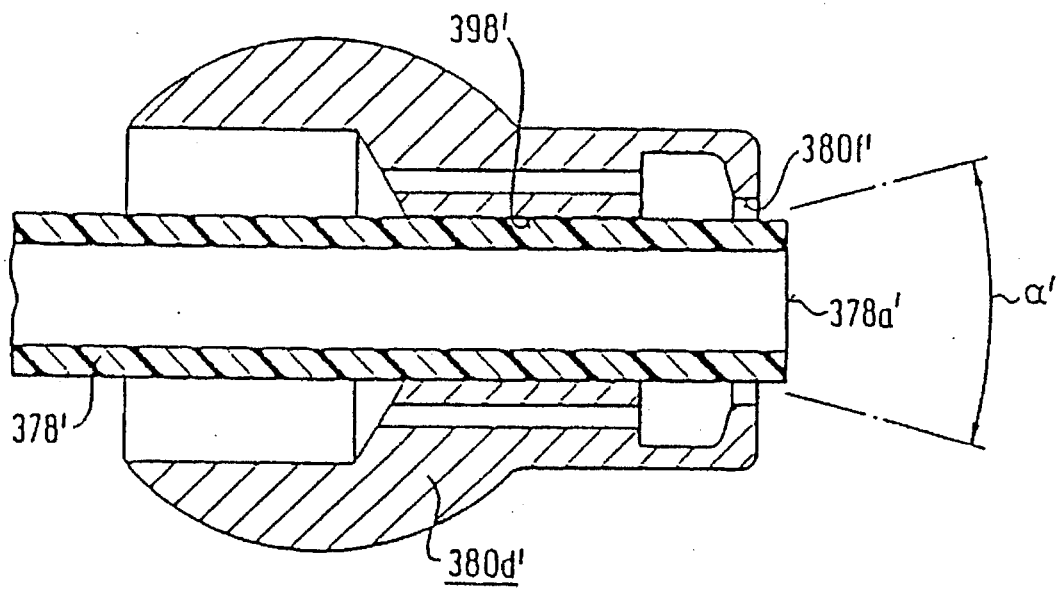
Figure 12:
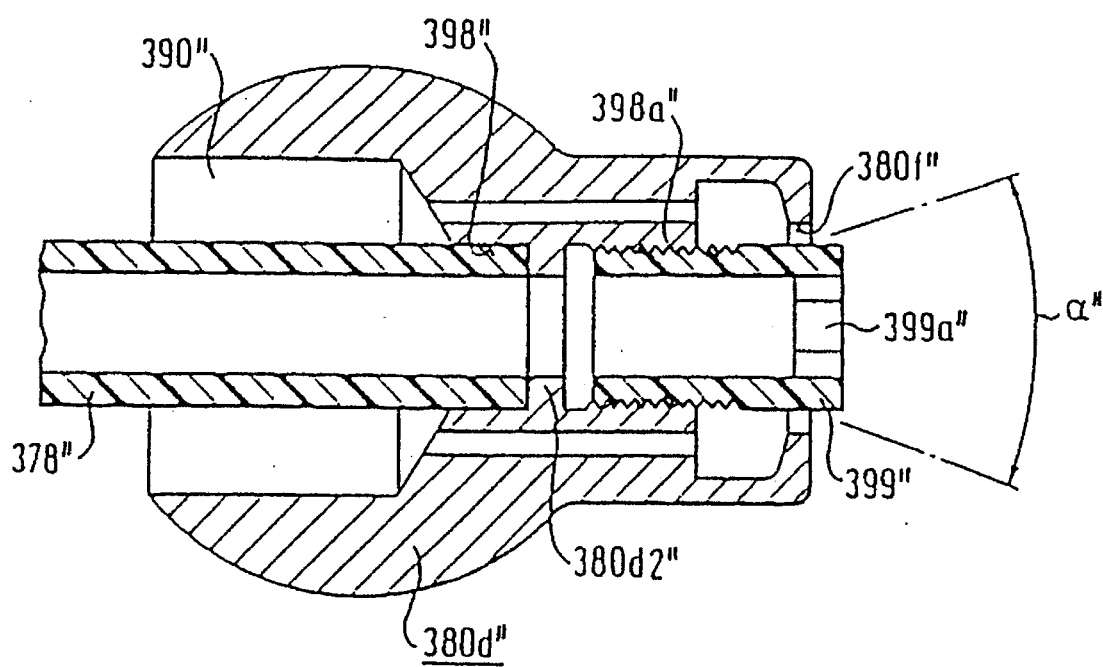

By driving the individual control circuits as a function of the XYZ-position reached by means of coordinate travel units 14, 16, 11 along path C, each section of the wall of die 12 can be sprayed in the desired manner with working medium, etc. By the use of the spray elements shown in FIGS. 3–12 and the process according to the invention, which will be described below on the basis of FIGS. 13–16 with several process variants as examples, the amount of lubricant supplied to each individual section of the wall of die 12 can be metered and apportioned in an essentially infinitely variable manner. The desired amount of lubricant to be dispensed per unit time by the individual spray elements for each set of coordinates of XYZ travel units 14, 16, 11 can be preset as a function of other operating parameters, such as the speed of the XYZ travel units, the flare angle α of the spray jet (see, for example, FIGS. 10–12), or the like. A more detailed discussion of the manner in which these values are predetermined will be presented further below.

Figure 2:
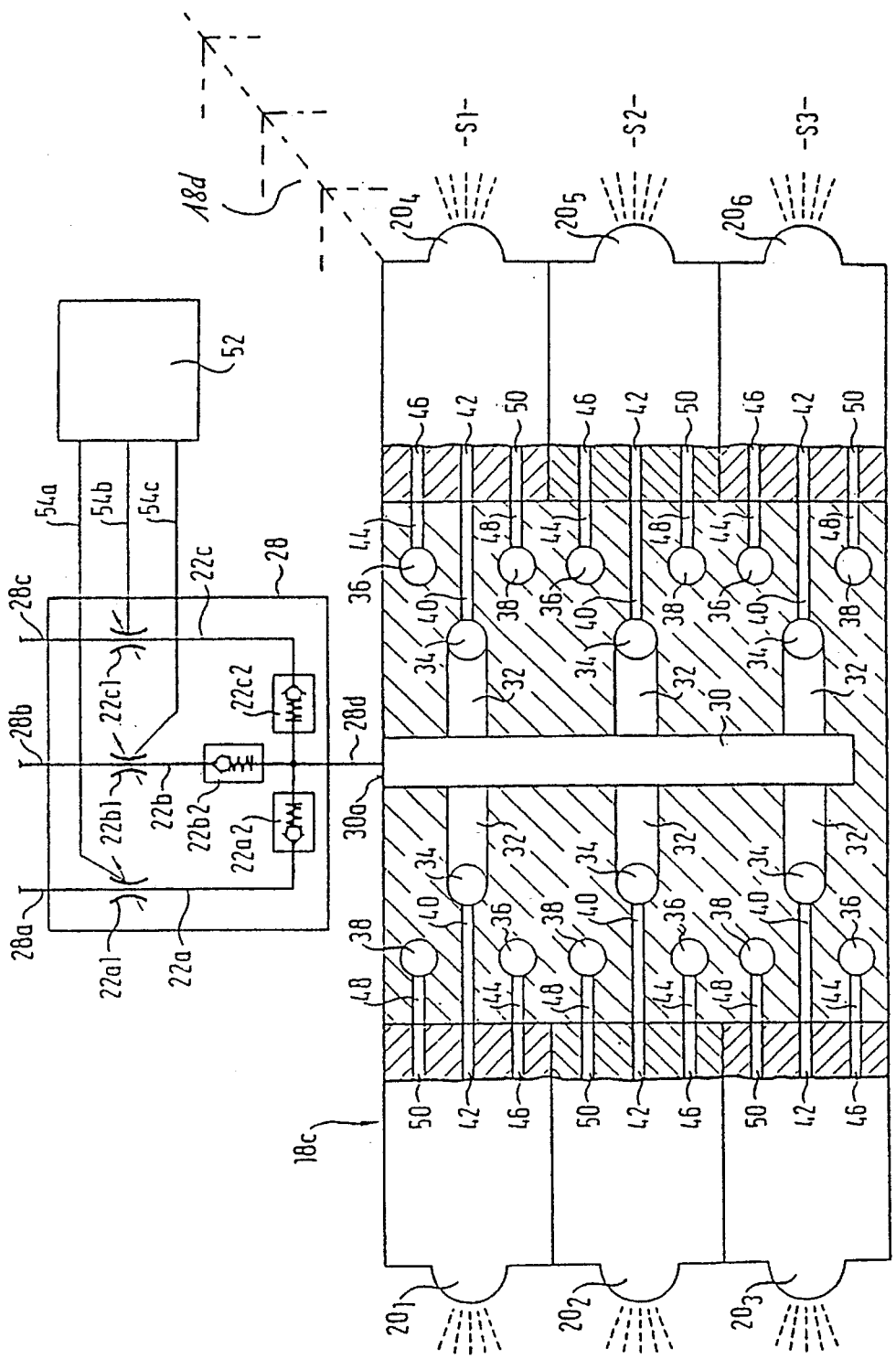
Figure 3:
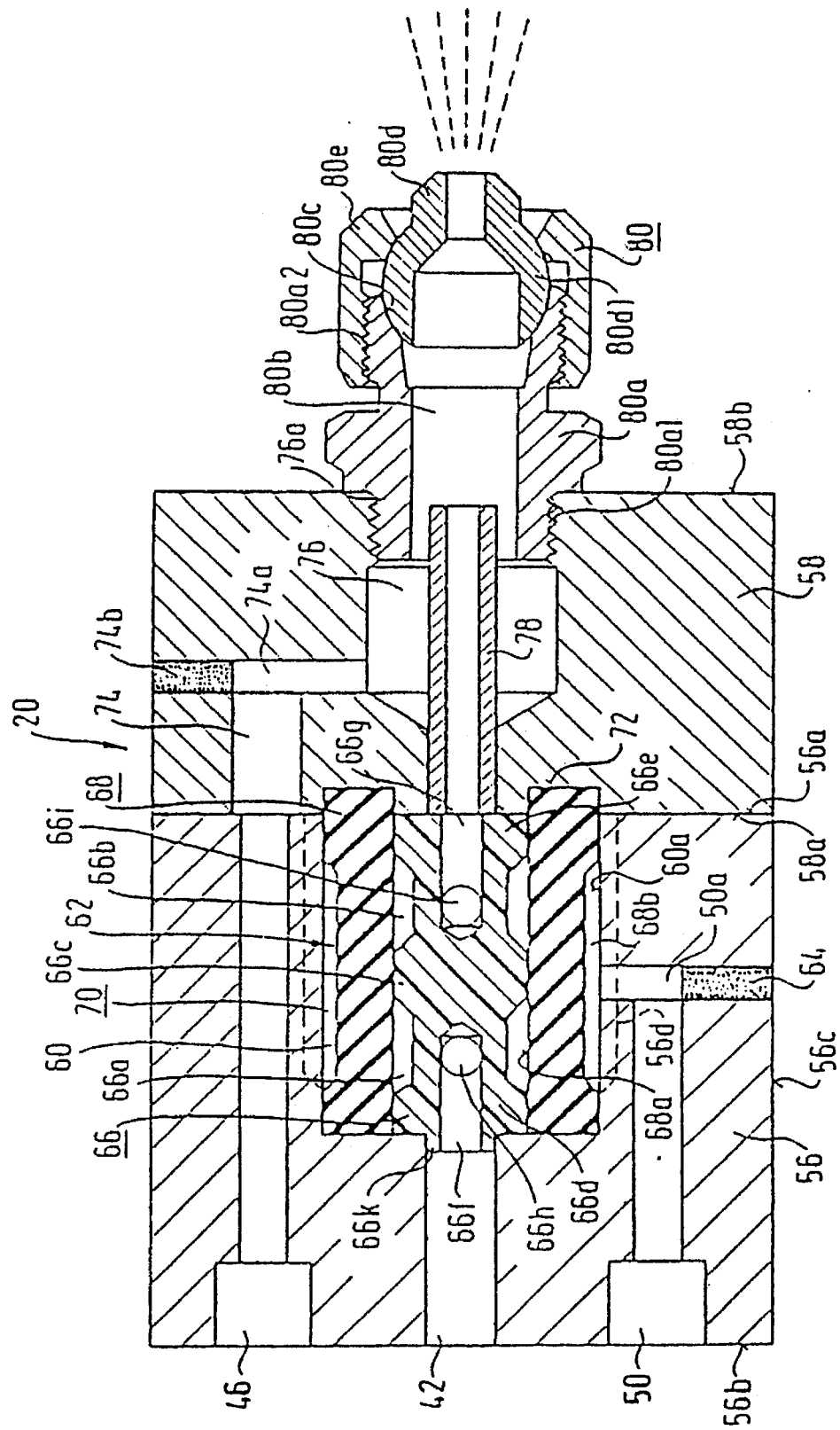
Figure 4:
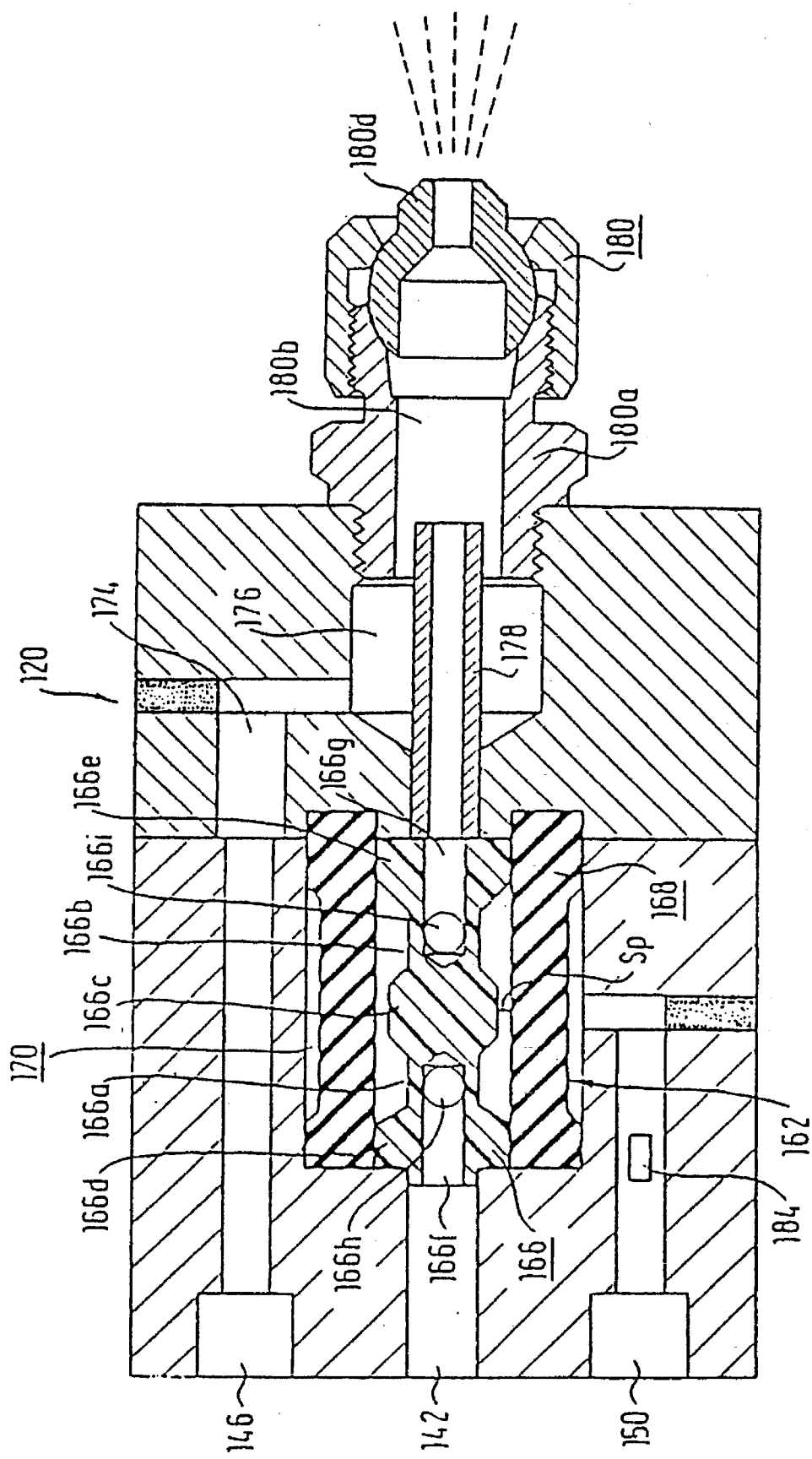
Figure 5:
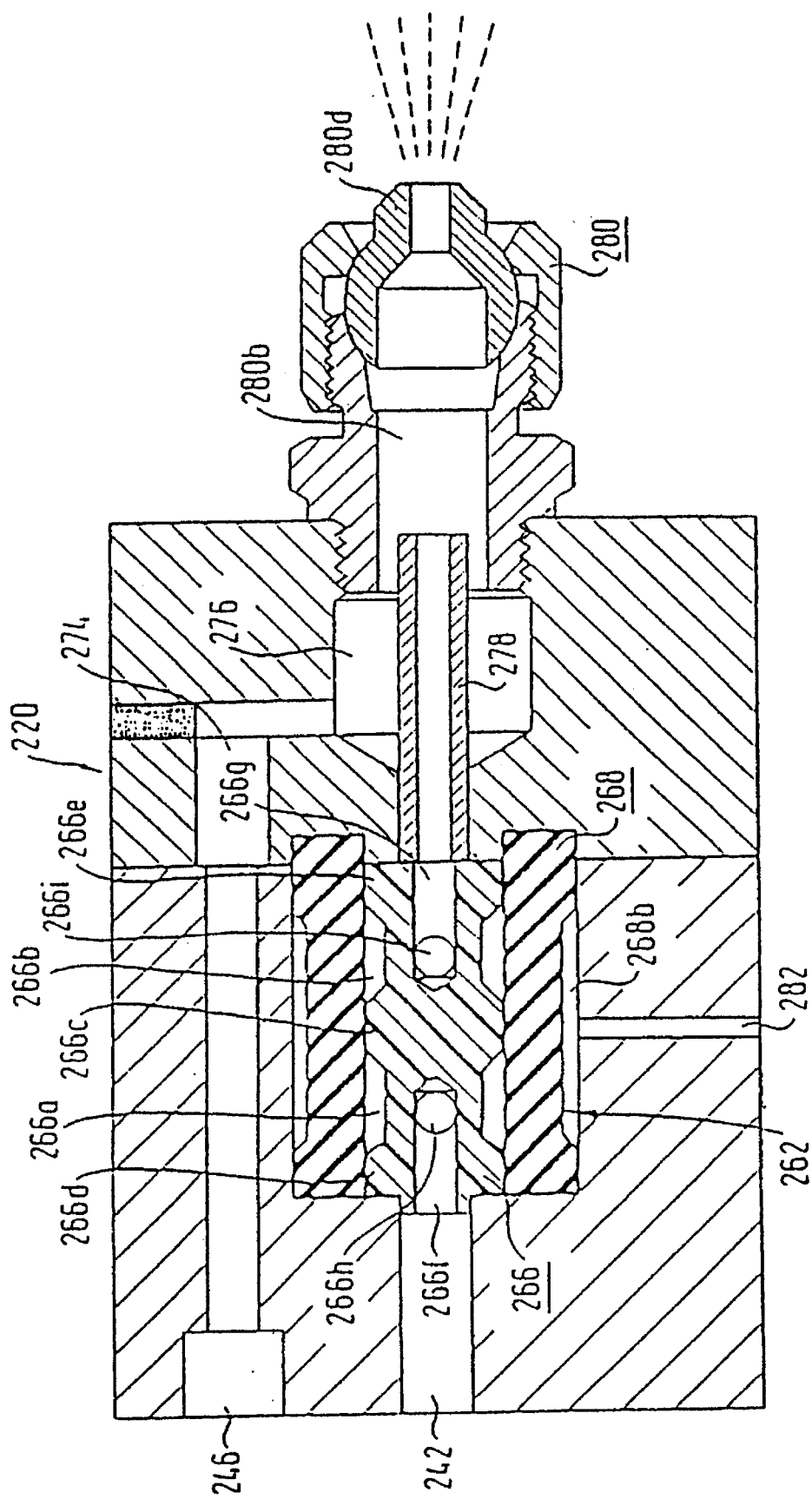
Figure 13:
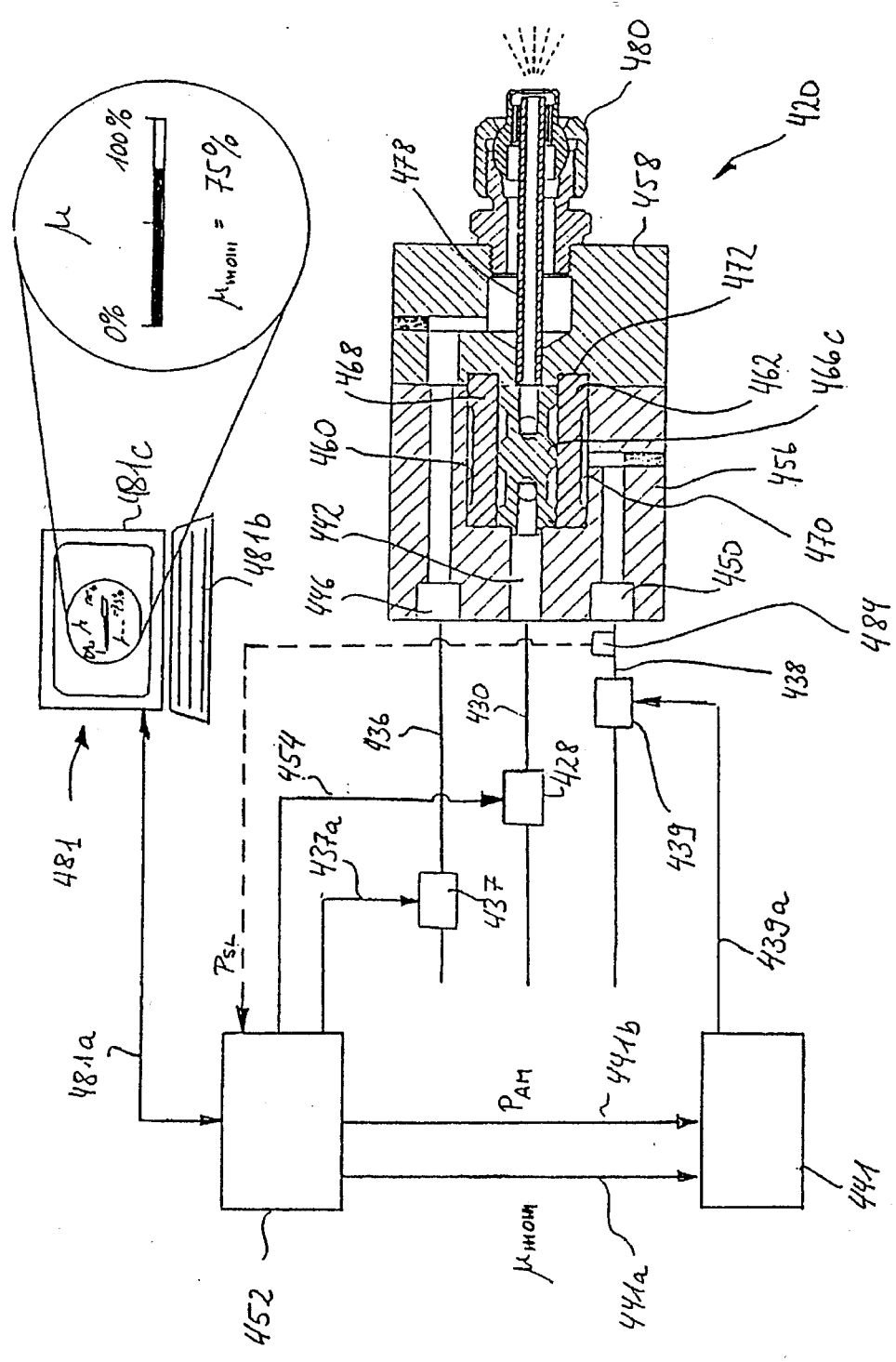
FIG. 13 is a schematic diagram of a switching device for the operation of a spray element operating according to the external mixing principle according to a first process variant of the invention.

FIG. 13 shows a circuit design for the operation of a spray element working according to the external mixing principle according to a first variant of the process of the invention, where analogous parts are provided with the same reference numbers as in FIGS. 1–3, except that they are raised by the number 400.

Figure 6:
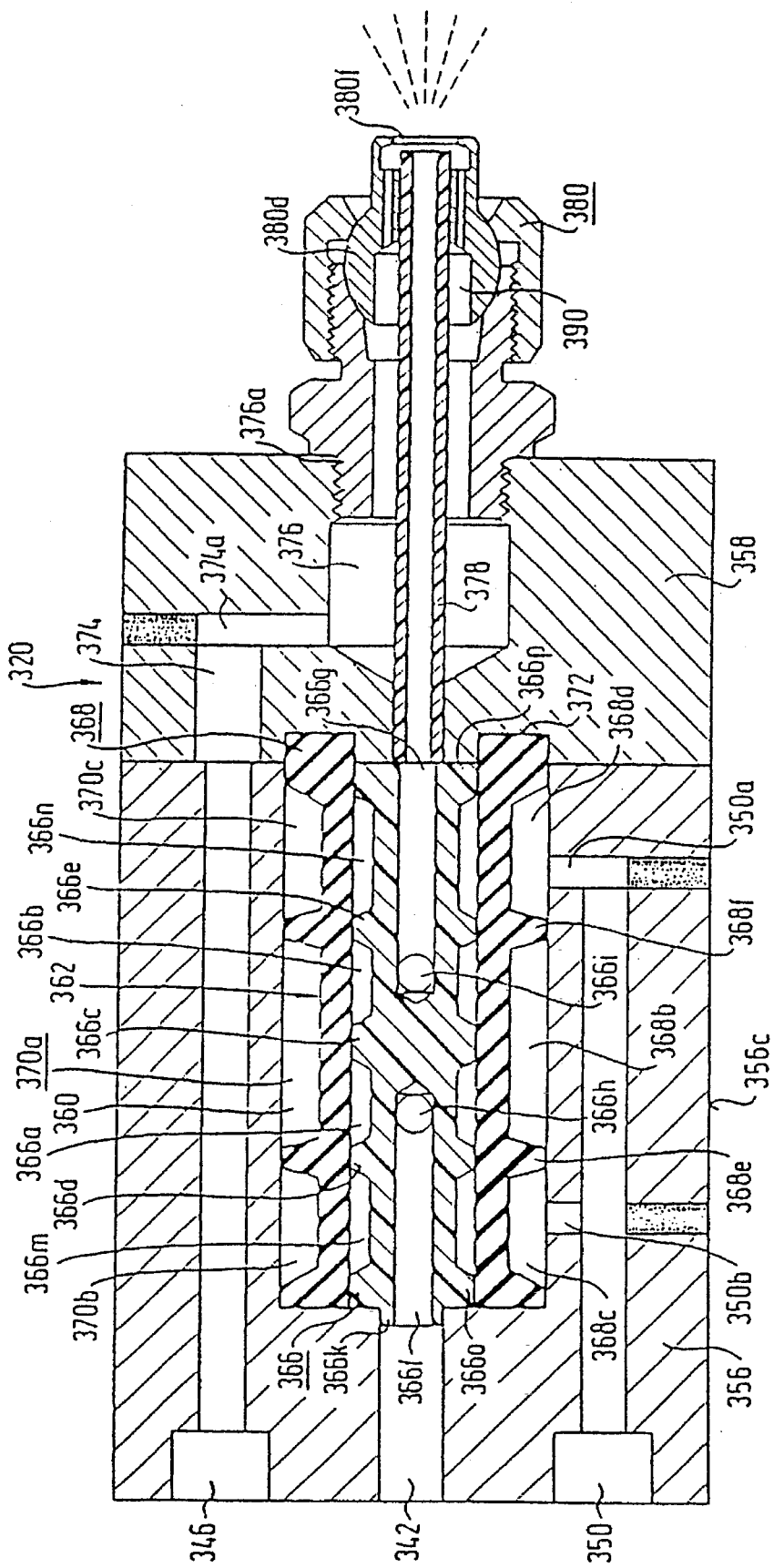
Figure 7:
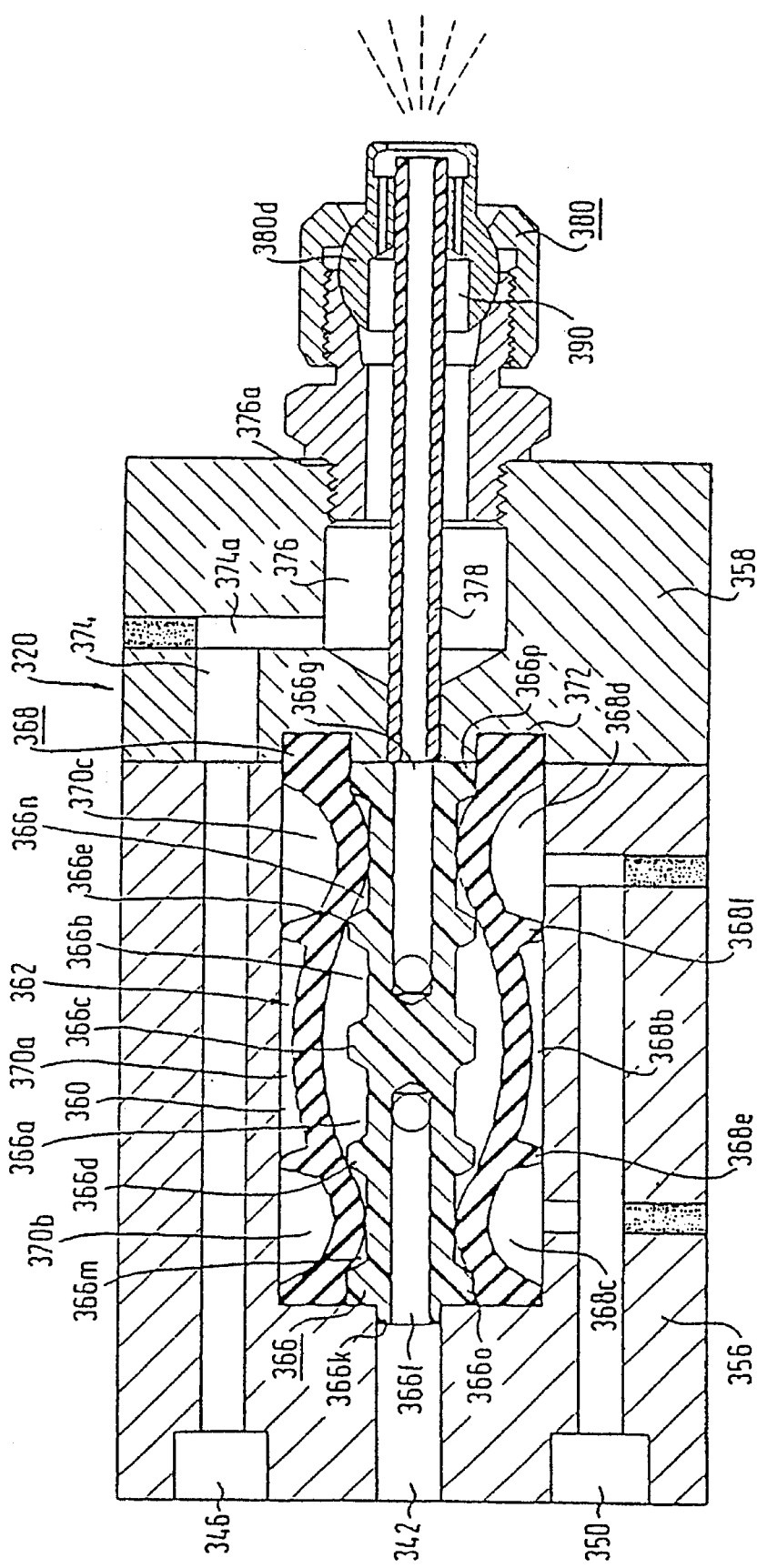
Figure 8:
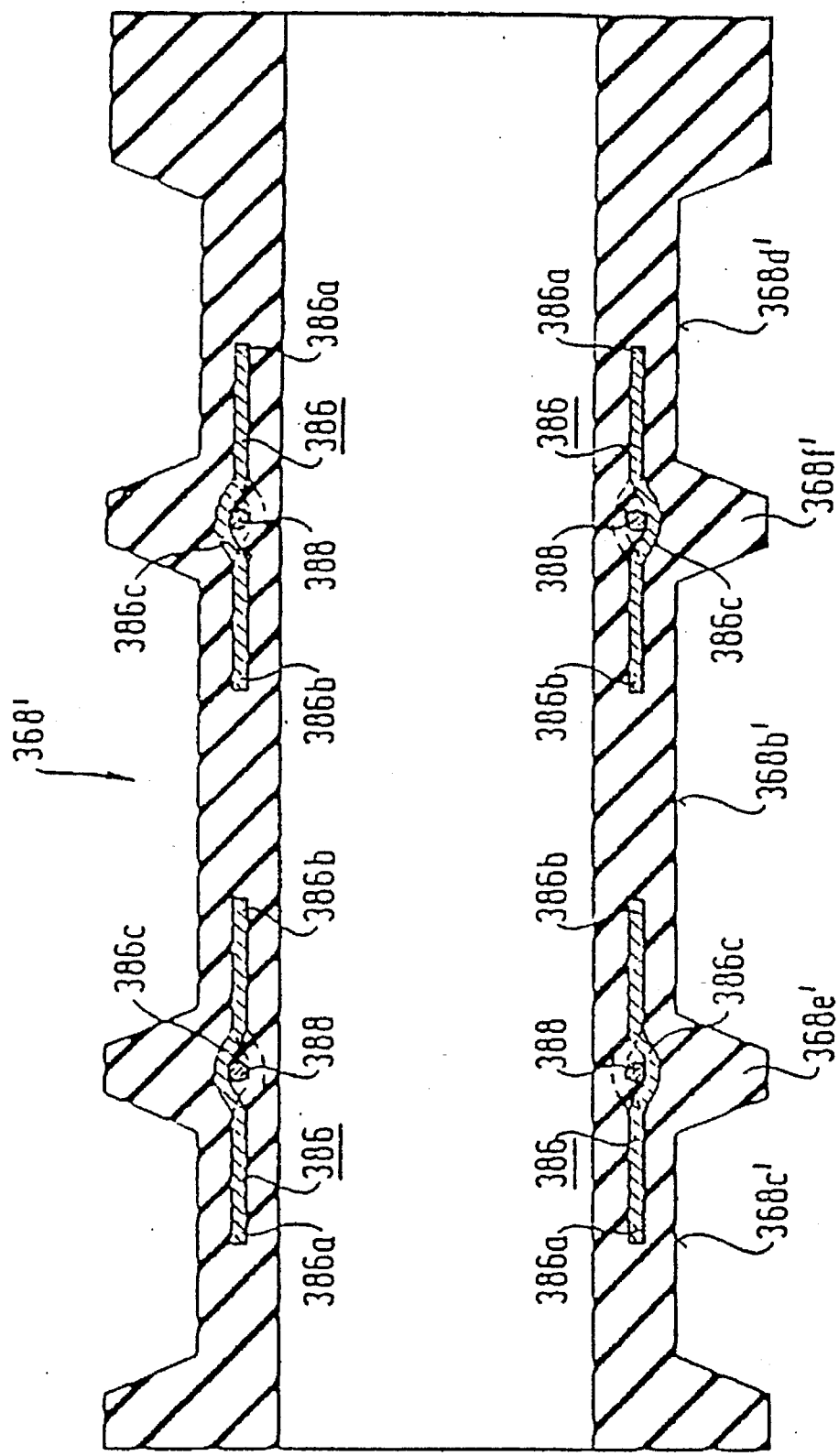
Figure 9:
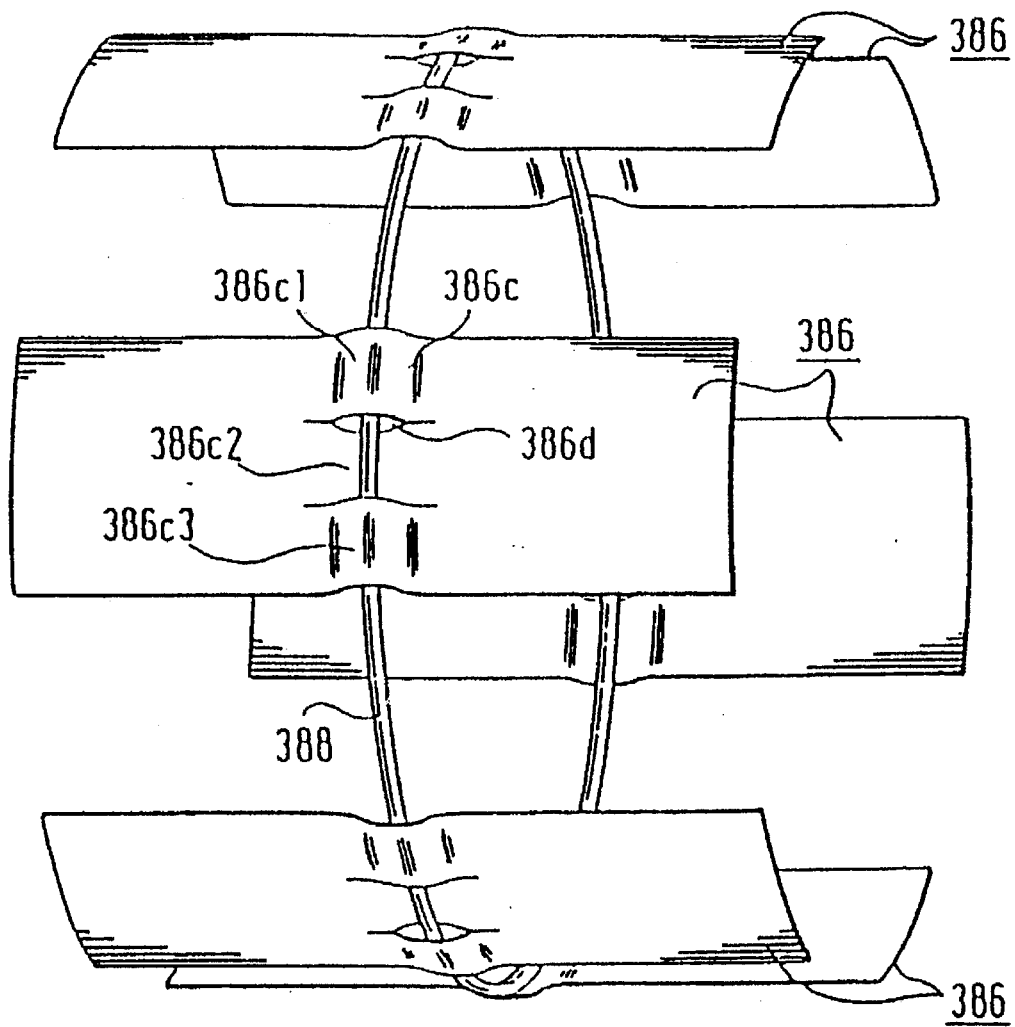

Spray element 420 operates according to the external mixing principle, which has been explained in detail above with reference to the embodiment according to FIG. 6. The design of metering valve 462 corresponds to that of metering valve 62 of the embodiment according to FIG. 3, but, in contrast to that valve, it is acted on in the opening direction by the pressure of the lubricant being fed to it through line 442 and in the closing direction by the control air pressure being supplied to control chamber 470 through line 450. A flexible section of tubing 478 leads from metering valve 462 to nozzle assembly 480, which works according to the external mixing principle.

It is important to remember that the outside diameter of valve body 468 is essentially the same as the inside diameter of recess 460. The length of valve body 468, however, is slightly greater than the sum of the depths of recess 460 and ring-shaped groove 472, so that, when the two housing parts 456 and 458 are assembled, valve body 468 comes to rest against the boundary walls of recess 460 and simultaneously serves as an upstream and downstream seal to prevent the undesirable escape of working medium. This obviously applies also to the embodiments described above.

Feed line 438 for control air connected to control line 450 is provided with a proportional valve 439, by means of which a control unit 441 is able to influence the control air pressure acting from control chamber 470 on the valve body. Control unit 441 is connected for this purpose to the proportional valve by way of a control line 439a. In a similar way, a valve unit 428, influencing the pressure of the working medium in feed lines 430 and 442, and a proportional valve 437, influencing the pressure of the blast air in feed lines 436 and 446, is connected by way of control lines 454 and 437a, respectively, to an additional control unit 452. The design of valve unit 428 is preferably the same as that of valve unit 28 shown in FIG. 2, so that spray element 420 can be used to spray different working media, e.g., lubricant and water in the simplest case, either separately or mixed. Furthermore, valve unit 428 also makes it possible to vary the pressure $P_{AM}$ of the working medium.

During the preparation of casting die 12 (see FIG. 1) for the next work cycle, spray tool 18 is carried by means of XYZ travel units 14, 16, 11 inside die 12 under the control of a computer program being run on a computer system 481. Inside the die, the tool is moved along path C=f(X,Y,Z) in such way that die 12 is completely spray-coated with lubricant. For each set of coordinates (XYZ), comprising an X-position value, a Y-position value, and a Z-position value for spray tool 18, computer system 481 transmits the operating parameter values required for each spray element 420 to control unit 452 via a data line 481a. These operating parameter values are in particular the composition and the pressure $P_{AM}$ of the working medium to be sprayed, the pressure $P_{BL}$ of the blast air, and the desired amount of lubricant to be dispensed $\mu_{mom}$.

The kinetic energy of the sprayed droplets can be varied by way of the absolute pressure $P_{AM}$ of the working medium. In the area of especially hot die wall regions, on which the Leidenfrost effect is especially pronounced, the vapor blanket hindering the wetting of the die wall can be reliably broken through by the use of a higher working medium pressure, so that the desired amount of lubricant can be deposited on the die wall. The setting corresponding to the desired value of pressure $P_{AM}$ of the working medium is transmitted to valve 428 by way of line 454. The setting corresponding to the desired blast air pressure $P_{BL}$ is transmitted to valve 437 in a similar manner.

Control unit 452, furthermore, transmits the desired amount of lubricant to be dispensed $\mu_{mom}$ and the desired pressure $P_{AM}$ of the working medium by way of two control lines 441a, 441b to control unit 441 to set the effective cross section of metering valve 462. Control unit 441 derives a corresponding control command from these parameters and transmits it to valve 439.

In the case of a metering valve such as metering valve 462 shown in FIG. 13, for example, which, when membrane 468 has been lifted up from valve seat 466c, presents essentially constant and equal actuation surfaces to pressure $P_{AM}$ of the working medium and pressure $P_{SL}$ of the control air, the effective metering cross section can be adjusted by influencing the difference $P_{AM}-P_{SL}$ between these two pressures. If, for example, it is necessary for the pressure $P_{AM}$ of the working medium to be higher by a value of $P_0$ at a certain position $X_0$, $Y_0$, $Z_0$ on path C, the essentially equal effective cross section $\Phi(X_0,Y_0,Z_0)$ can be obtained by also increasing the control air pressure $P_{SL}$ by the amount $P_0$. Because the amount of working medium dispensed per unit time undergoes hardly any change as a function of the pressure $P_{AM}$ of the working medium, the working medium flow rate remains essentially constant.

In the determination of the control command to be issued in each case to proportional valve 439, the influence of forces which remain essentially constant in their order of magnitude, e.g., a closing force originating from the elasticity of the membrane or its internal pretension, will, of course, also be taken into account; and it is also possible to take into consideration the dependence, at a constant effective cross section, of the flow rate on the working medium pressure $P_{AM}$ which, although weak, does in fact exist.

Feed line 438 for control air is, furthermore, provided with a pressure sensor 484, which measures the value of pressure $P_{SL}$ prevailing in this feed line and transmits it to control unit 452. When pressure monitor 484 detects an unintended drop in the control air pressure, control unit 452 issues a closing command to valve unit 428 and possibly also to proportional valve 437, so that no more working medium and possibly also no more blast air can be supplied through feed lines 430 and 442, and/or 436 and 446 respectively.

In this context it is well to remember that the internal pretension of valve membrane 468 in the direction of the closed position is not really required to achieve the above-described control of the discharge of working medium; however, it is advantageous with respect to the fail-safe function, also described above, during a drop in the control air pressure, because membrane 468 in this case keeps valve 462 closed after the shutoff of the supply of working medium and prevents the working medium from continuing to drip.

As already mentioned above, the parameters required to achieve the desired spray behavior of spray tool 18, namely, pressure $P_{AM}$ of the working medium to be sprayed, pressure $P_{BL}$ of the blast air, and the desired amount of lubricant to be dispensed $\mu_{mom}$, are stored for each of spray elements 20 of spray tool 18 and for each position (X,Y,Z) of path C in computer system 481.

All of these parameter values can be revised interactively by an operator with the help of computer system 481. That is, during the course of the operation of molding device 12, it may prove necessary to adapt some of the parameters to circumstances which may have changed. The operator can, for example, recognize directly from the observation of spray-coated die 12 and from an inspection of the finished molded article whether too much or too little working medium has been sprayed onto a certain part of die 12.

Namely, if too much working medium has been sprayed on, it runs down walls 12a, 12b of die 12, as already mentioned above, and if too little working medium is sprayed on, drawing or welding points are formed on the molded article. Furthermore, die 12 can have too high a temperature at certain points, which, as a result of the Leidenfrost effect, prevent the proper coverage of the die walls with lubricant. It is also possible to provide sensors to monitor the temperature of the die walls (e.g., sensor 59 in FIG. 1).

If the operator has recognized that it is necessary to apply more or less working medium to a certain point on the die wall, the first step is to enter this position into computer system 481 by way of keyboard 481b. Nowadays, such inputs are usually accomplished by way of menus; for example, a computer mouse is used to identify the point in question on a graphic display of die 12 shown on monitor 481c and then confirmed by clicking the button. Then the operator issues the command via keyboard 481b to apply more or less working medium to this point. This command can be purely qualitative, but it can also contain quantitative data on the desired change. According to a program previously loaded into it, computer system 481 then determines, from these inputs, the positions (X,Y,Z) on path C at which the amount of working medium to be sprayed per unit time must be changed and which spray elements 20 will be doing the spraying. Inputs to change the kinetic energy of the droplets are made in the same way. In the next molding cycle, the operator will check to see whether the inputs brought about the desired result and will adjust the inputs if necessary until the finished molded article has the desired quality.

The operator can also call up the current settings for any point on path C and any spray element 20. It is advantageous for the amount of working medium dispensed per unit time $\mu_{mom}$ to be displayed to the operator as a fraction of the maximum amount of working medium which can be dispensed, that is, the amount dispensed when the switching valve is all the way open. This display can be given in both analog (bar graph) and digital formats, as shown in the large circle in FIG. 13, giving a detailed view of the display of monitor 481c. In the example given, 75% of the maximum sprayable amount of working medium is dispensed at the specific point on the path in question (not indicated in itself).

In place of metering valve 462, the effective cross section of which can be changed in an essentially infinitely variable manner as a function of the control air pressure, it is also possible to use a valve which can be set merely between a maximum open and a maximum closed state, and in which the amount of working medium dispensed per unit time can be controlled by influencing the cycle ratio, that is, the fraction of the total time during which the valve is opened. Valves of this type are usually equipped with an electromagnetically actuated mechanism. It is obvious that, as a function of the speed of the spray tool along its path, the duration of the individual valve-opening intervals must be short enough to produce a quasi-continuous spray jet.

Figure 14:
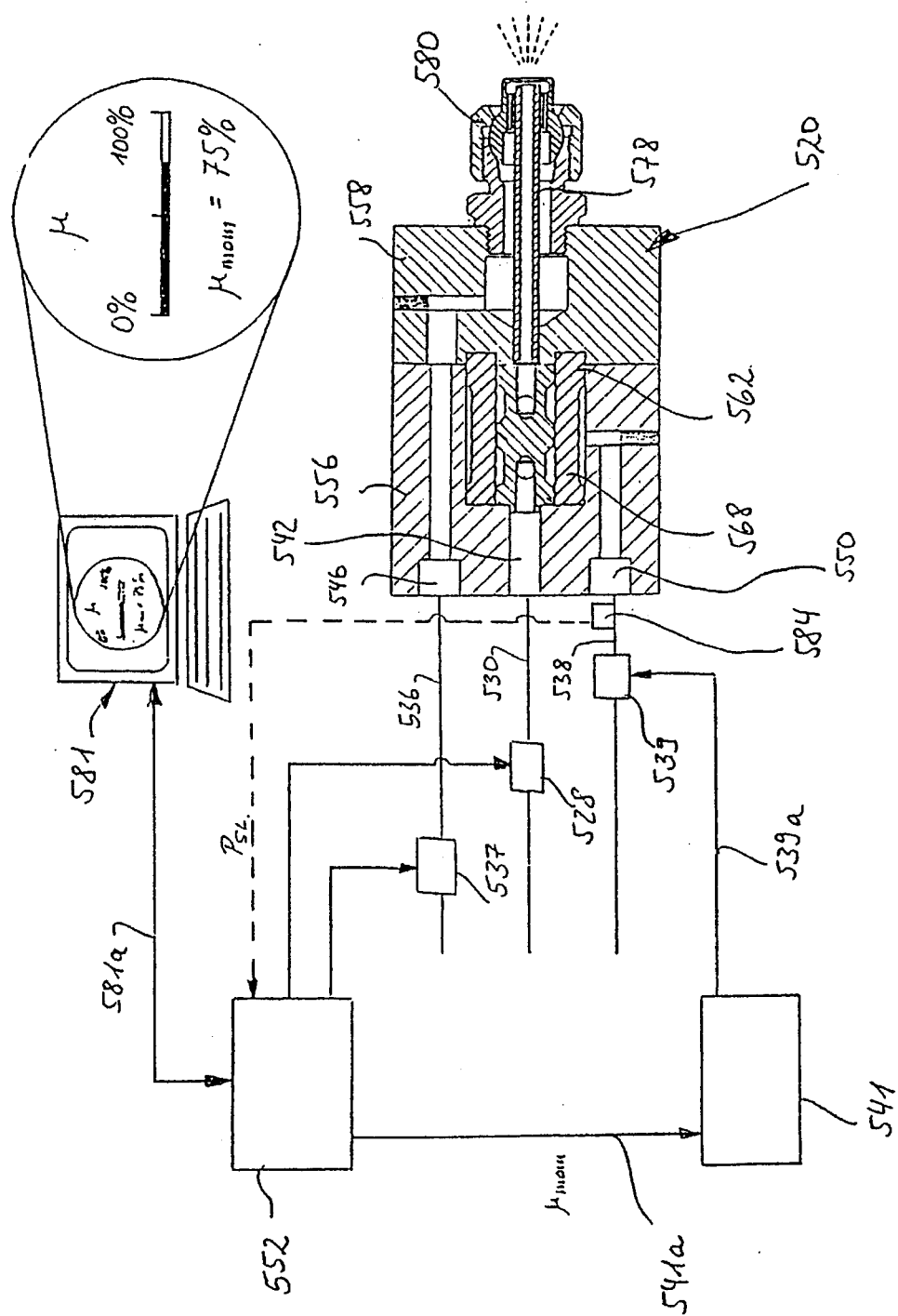
FIG. 14 is a schematic diagram of a switching device for the operating of a spray element operating according to the external mixing principle according to a second process variant of the invention.

FIG. 14 shows a circuit design for the operation of a spray element operating according to the external mixing principle according to another variant of the process. Analogous parts are again provided with the same reference numbers as those in FIG. 1–3, except that they are raised by the number 500.

The circuit design according to FIG. 14 differs from that according to FIG. 13 only in that control unit 552 does not transmit the value of pressure $P_{AM}$ of the working medium to additional control unit 541, although it does transmit the desired value of the amount of working medium to be dispensed per unit time $\mu_{mom}$. The circuit design according to FIG. 14 is suitable, therefore, for an operation in which the value $P_{AM}$ of the pressure of the working medium is kept constant during operation and the amount dispensed per unit time $\mu_{mom}$ is controlled merely by influencing the control air pressure $P_{SL}$.

Otherwise, the circuit design according to FIG. 14 and also spray element 520 are identical to those shown in FIG. 13 in terms of design and function. In this regard, therefore, reference is made to the description of FIG. 13 presented above. In particular, what was said concerning the interactive revision of the operating parameter values by the operator and concerning the design of valve 562 also applies to the embodiment according to FIG. 14.

In principle, it is also possible to keep the control air pressure $P_{SL}$ constant and to vary the working medium pressure $P_{AM}$. A circuit design realizing this possibility is shown in FIG. 15, where, again, analogous parts are provided with the same reference numbers as in FIGS. 1–3, except that they are raised by the number 600.

The circuit design according to FIG. 15 differs from that according to FIG. 14 only in the following points: control unit 652 is connected by way of a control line 639b to proportional valve 639 and serves to keep control air pressure $P_{SL}$ constant. Control unit 641, however, is connected by a control line 641c to valve unit 628 and influences pressure $P_{AM}$ of the working medium in such a way that spray element 620 dispenses the desired amount $\mu_{mom}$ of working medium per unit time. Finally, pressure monitor 684 is connected to control unit 641, so that it can issue a stop command in the event of a drop in the control air pressure at valve unit 628.

Figure 15:
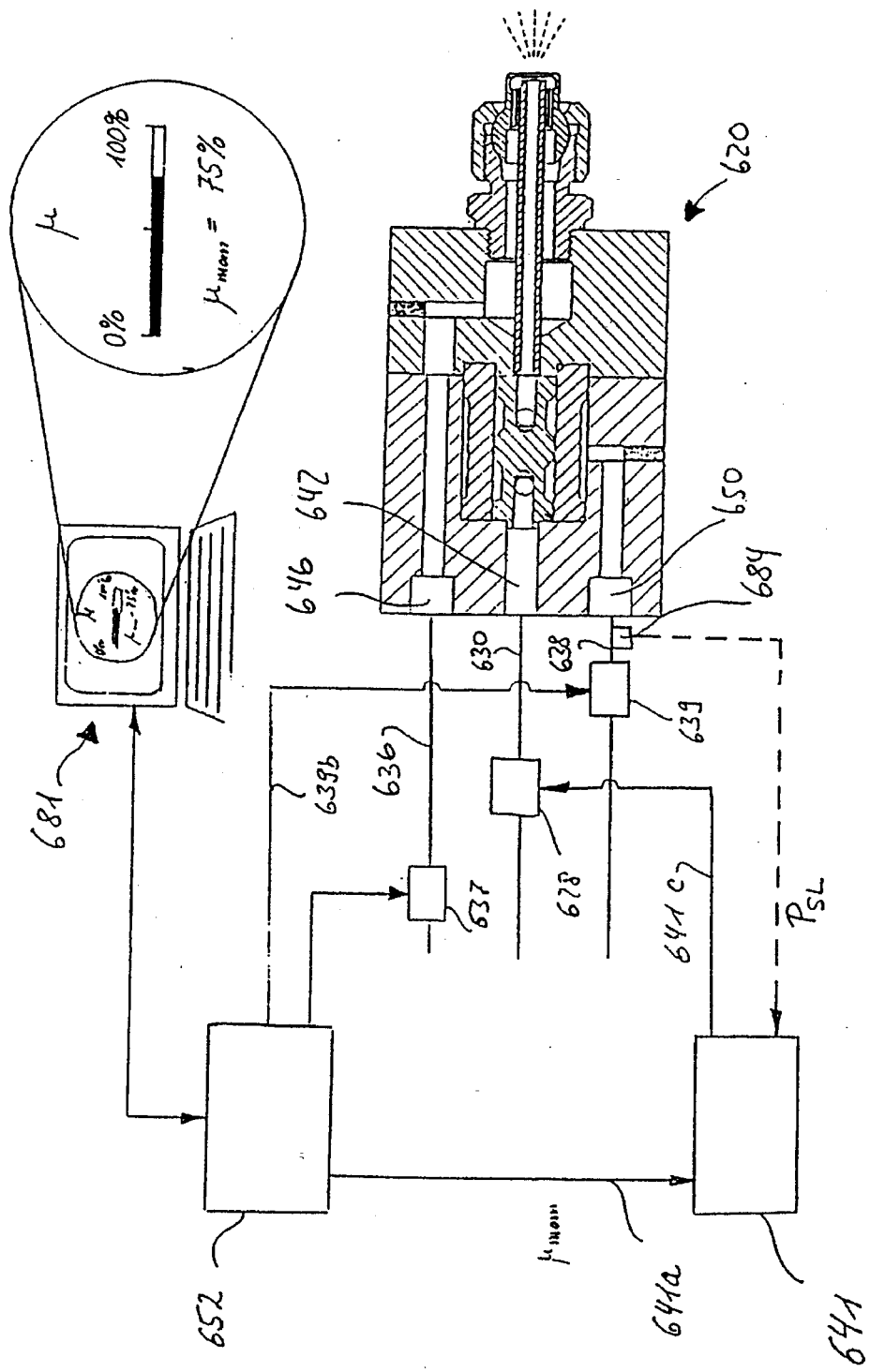
FIG. 15 is a schematic diagram of a switching device for the operation of a spray element operating according to the external mixing principle according to a third process variant of the invention.

Otherwise, the circuit design according to FIG. 15 is the same as the embodiment according to FIG. 14, including the design of spray element 620. Reference is therefore made to the description of that figure.

Figure 16:
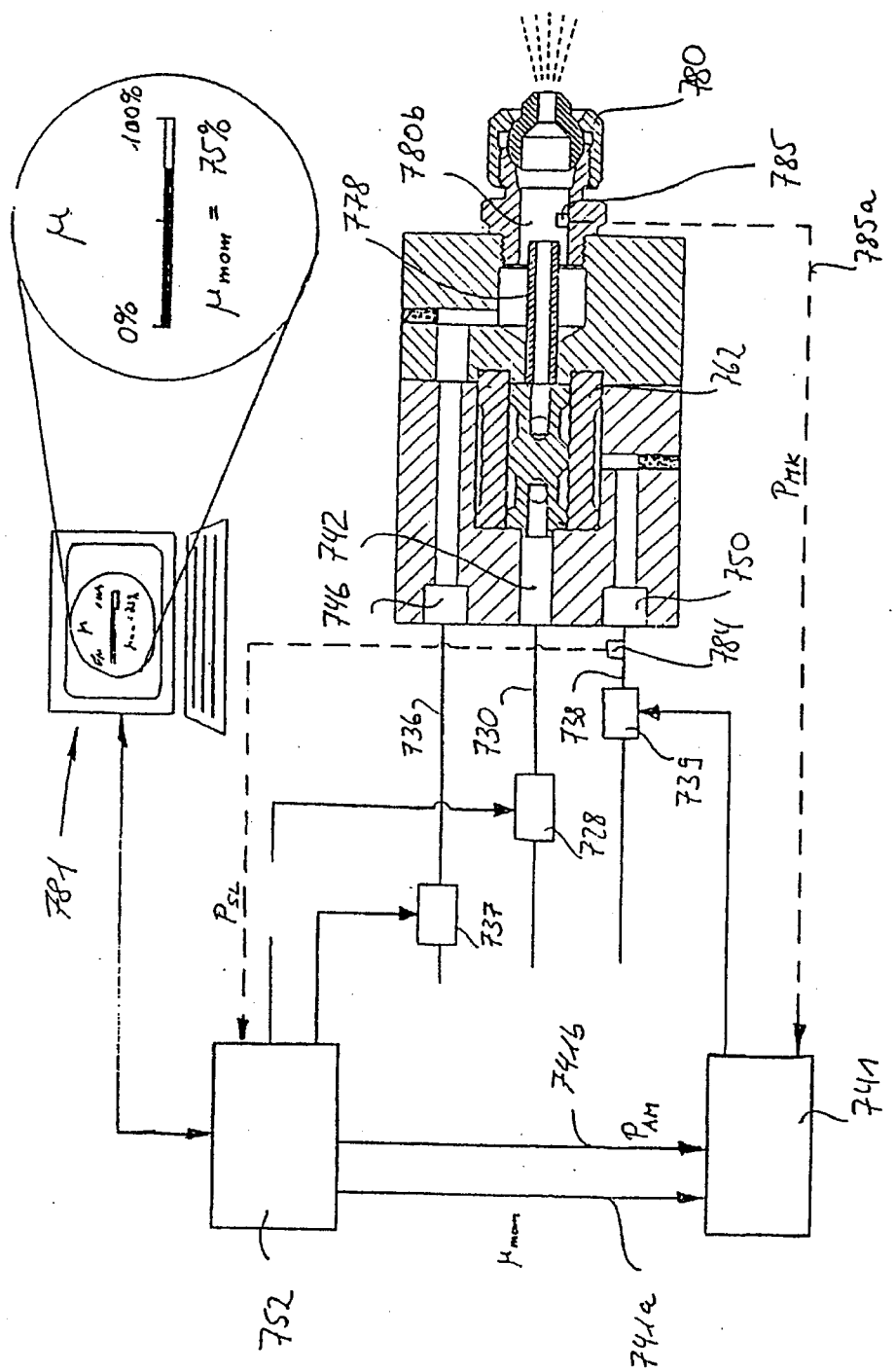
FIG. 16 is a schematic diagram of a switching device for the operation of a spray element operating according to the internal mixing principle according to another process variant of the invention.

FIG. 16 shows a circuit design for the operation of a spray element according to another variant of the process, where similar parts are again provided with the same reference numbers as in FIG. 1–3, except that they are now raised by the number 700.

The circuit design according to FIG. 16 differs from that of FIG. 13 only in the following points: spray element 720 works according to the internal mixing principle; that is, the working medium supplied through valve unit 728 and feed lines 730, 742 and metered through valve 762 is atomized in a mixing chamber 780b by the blast air supplied by way of proportional valve 737 and feed lines 736, 746 and then blown out through nozzle assembly 780. Pressure $P_{MK}$ building up in mixing chamber 780b acts backwards by way of section of tubing 778 on metering valve 762 and changes the pressure relationships present on the downstream side of this valve. Because it can be quite desirable to change the throughput and thus the pressure of the blast air as well, a parameter reflecting these downstream pressure conditions must therefore be monitored also and taken in account in the determination of the control air pressure $P_{SL}$ for adjusting the desired amount of lubricant dispensed per unit time. For this purpose, a pressure sensor 785 is provided in mixing chamber 780b; this sensor is connected by way of a signal line 785a to control unit 741, which, under consideration of the predetermined desired amount of lubricant $\mu_{mom}$ (transmitted beforehand via line 741a), the predetermined pressure $P_{AM}$ of the working medium (transmitted beforehand via line 741b), and the measured pressure $P_{MK}$ prevailing in mixing chamber 780b, derives a control command for proportional valve 739.

Otherwise, the circuit design according to FIG. 16 is identical to that shown in FIG. 13 in terms of design and function. In this regard, therefore, reference is made to the description of FIG. 13 presented above. In particular, what was said concerning the interactive revision of the operating parameter values by the operator and concerning the design of valve 762 also applies to the embodiment according to FIG. 16.

We claim:

1. Process for the application of a liquid die wall treatment agent to areas of the die walls of a molding device by means of at least one spray element with metering of the flow rate of the die wall treatment agent by a metering valve, having a metering cross section for the liquid die wall treatment agent, and which can be influenced by a secondary fluid, characterized by the features:

(a) a metering valve with a valve membrane of variable shape, kept essentially free of guide friction is used;
   (b) one side of the valve membrane is acted on by the die wall treatment agent, while the other side is acted on by the secondary fluid;
   (c) the pressure on at least one side of the membrane is influenced by flow rate-adjusting means, which results in variable flow rates; and
   (d) the flow rates are determined by different positions of the membrane.

2. Process according to claim 1, characterized in that the secondary fluid is a control fluid which is not mixed with the die wall treatment agent.

3. Process according to claim 1, characterized in that the pressure of the die wall treatment agent is kept constant, and the pressure of the secondary fluid is varied by acting on the flow rate-adjusting means.

4. Process according to claim 1, characterized in that the pressure of the secondary fluid is kept constant, and the pressure of the die wall treatment agent is varied by acting on the flow rate-adjusting means.

5. Process according to claim 1, characterized in that the pressure of the die wall treatment agent is adjusted according to the results of monitoring the contact behavior of the die wall treatment agent with the individual die wall areas, and in that, by adjustment of the flow rate-adjusting means, the pressure of the secondary fluid is made to follow the pressure of the die wall treatment agent.

6. Process according to claim 1 for the application of a liquid die wall treatment agent to die wall areas of a molding device by means of at least one spray element, characterized in that, during a spray process, the spray element is moved relative to the molding device along a path, and in that the amount of liquid die wall treatment agent dispensed per unit time by the spray element varies as a function of the individual position on the path and, as the path is traversed, is positively adjusted for each individual position.

7. Process according to claim 1, characterized in that a gaseous atomizing agent is fed to the die wall treatment liquid downstream from the metering valve in such a way that the flow rate of the die wall treatment liquid downstream from the metering valve is not significantly influenced by this atomizing agent.

8. Process according to claim 1, characterized in that a gaseous atomizing agent is fed at a variable feed rate to the die wall treatment liquid downstream from the metering valve in such a way that the flow rate of the die wall treatment liquid downstream from the metering valve is influenced, and in that the pressure of the die wall treatment agent and/or the pressure of the secondary fluid varies in accordance with the pressure of the die wall treatment agent and/or secondary fluid thus influenced.

9. Process according to claim 8, characterized in that the flow rate thus influenced is monitored in a mixing chamber of the spray element.

10. Process according to claim 1, including said metering valve having a tubular membrane, one side of which is acted on by the die wall treatment liquid, while the other side is acted on by the secondary fluid and which, together with a ring-shaped contact surface, defines the metering cross section.

11. Process according to claim 1, including said metering valve having pressure-responsive sides, one side exposed to the pressure of the die wall treatment liquid and a second side exposed to the pressure of the secondary fluid.

12. Process according to claim 1 for the application of a liquid die wall treatment agent to areas of the die walls of a molding device by means of at least one spray element with metering of the flow rate of the die wall treatment agent by a metering valve, said metering valve defining a metering cross section for the liquid die wall treatment agent, characterized in that, during a spray process, the spray element is moved relative to the molding device along a path, and in that the metering cross section varies as a function of each individual position on the path and, as the path is traversed, positively adjusted for each individual position.

* * * * *

UNITED STATES PATENT AND TRADEMARK OFFICE
CERTIFICATE OF CORRECTION

PATENT NO. : 5,603,984
DATED : February 18, 1997
INVENTOR(S) : Karl-Heinz Keim, Rudi Kober and Hans-Dieter Renkl It is certified that error appears in the above-identified patent and that said Letters Patent is hereby corrected as shown below:

Column 5, line 8, "Large" should read -- large --;
Column 6, line 3, after "can" (second occurrence), insert -- be --;
Column 8, line 26, "564C" should read -- 54c --;
Column 9, line 30, "Ft. Ed." should be -- Tr. Ed. --;
Column 9, line 52, "16" should read -- 76 --;
Column 10, line 3, "18" should read -- 78 --;
Column 10, line 12, "80h" should read -- 80b --;
Column 11, line 9, "22b2, 22c2" should read -- 22b1, 22c1 --;
Column 11, line 49, "P" should read -- p --;
Column 11, line 54, "P" should read -- p --;
Column 11, line 55, "P", should read -- p --;
Column 12, line 10, "366n." should read -- 366n, --;
Column 12, line 27, "368d." should read -- 368d, --;
Column 13, line 4, "386" should read -- 386b --;
Column 13, line 11, "though" should read -- through --;
Column 13, line 29, "rasher" should read -- rather --;
Column 13, line 63, after "plastic," insert -- etc. --; and
Column 14, line 17, " mount" should read -- amount --.

Signed and Sealed this

Fifteenth Day of July, 1997

Attest:

BRUCE LEHMAN

*Attesting Officer*    *Commissioner of Patents and Trademarks*